(12) United States Patent
Sugawara et al.

(10) Patent No.: US 8,718,488 B2
(45) Date of Patent: May 6, 2014

(54) DRIVER AND OPTICAL TRANSMISSION APPARATUS

(75) Inventors: Mariko Sugawara, Kawasaki (JP); Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 441 days.

(21) Appl. No.: 13/204,811

(22) Filed: Aug. 8, 2011

(65) Prior Publication Data

US 2012/0045218 A1 Feb. 23, 2012

(30) Foreign Application Priority Data

Aug. 18, 2010 (JP) ................................. 2010-183037

(51) Int. Cl.
*H04B 10/58* (2013.01)
(52) U.S. Cl.
USPC .......................................... 398/193; 398/194
(58) Field of Classification Search
CPC .............................. H04B 10/504; H04B 10/58
USPC .................................................. 398/192–194
See application file for complete search history.

(56) References Cited

U.S. PATENT DOCUMENTS

| 7,440,703 | B2 * | 10/2008 | Shastri et al. ................. 398/183 |
| 2008/0266283 | A1 | 10/2008 | Suzuki et al. |

FOREIGN PATENT DOCUMENTS

| JP | 2004-004317 | 1/2004 |
| JP | 2006-40975 | 2/2006 |

* cited by examiner

*Primary Examiner* — Leslie Pascal
(74) *Attorney, Agent, or Firm* — Staas & Halsey LLP

(57) ABSTRACT

A driver for shaping a drive signal includes a pre-emphasis circuit, an offset adjustment circuit, and an amplifier. The pre-emphasis circuit symmetrically emphasizes a rising edge portion and a falling edge portion of the drive signal. The offset adjustment circuit applies a direct-current offset to the drive signal. The amplifier amplifies the drive signal with the direct-current offset adjusted by the adjustment circuit. The amplifier has an input-output characteristic with a nonlinear portion. The offset adjustment circuit adjusts the direct-current offset so that the drive signal is amplified in the nonlinear portion.

19 Claims, 27 Drawing Sheets

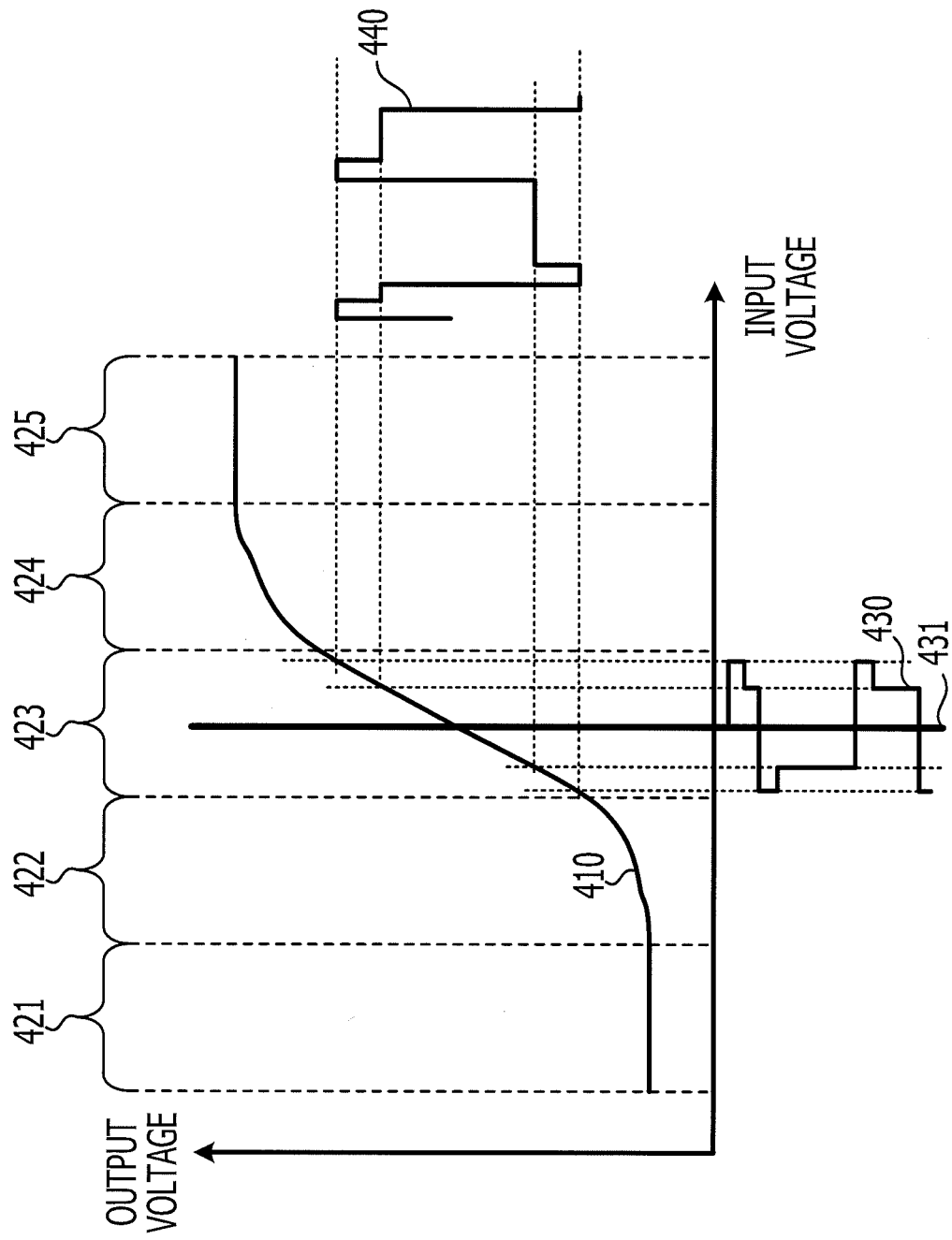

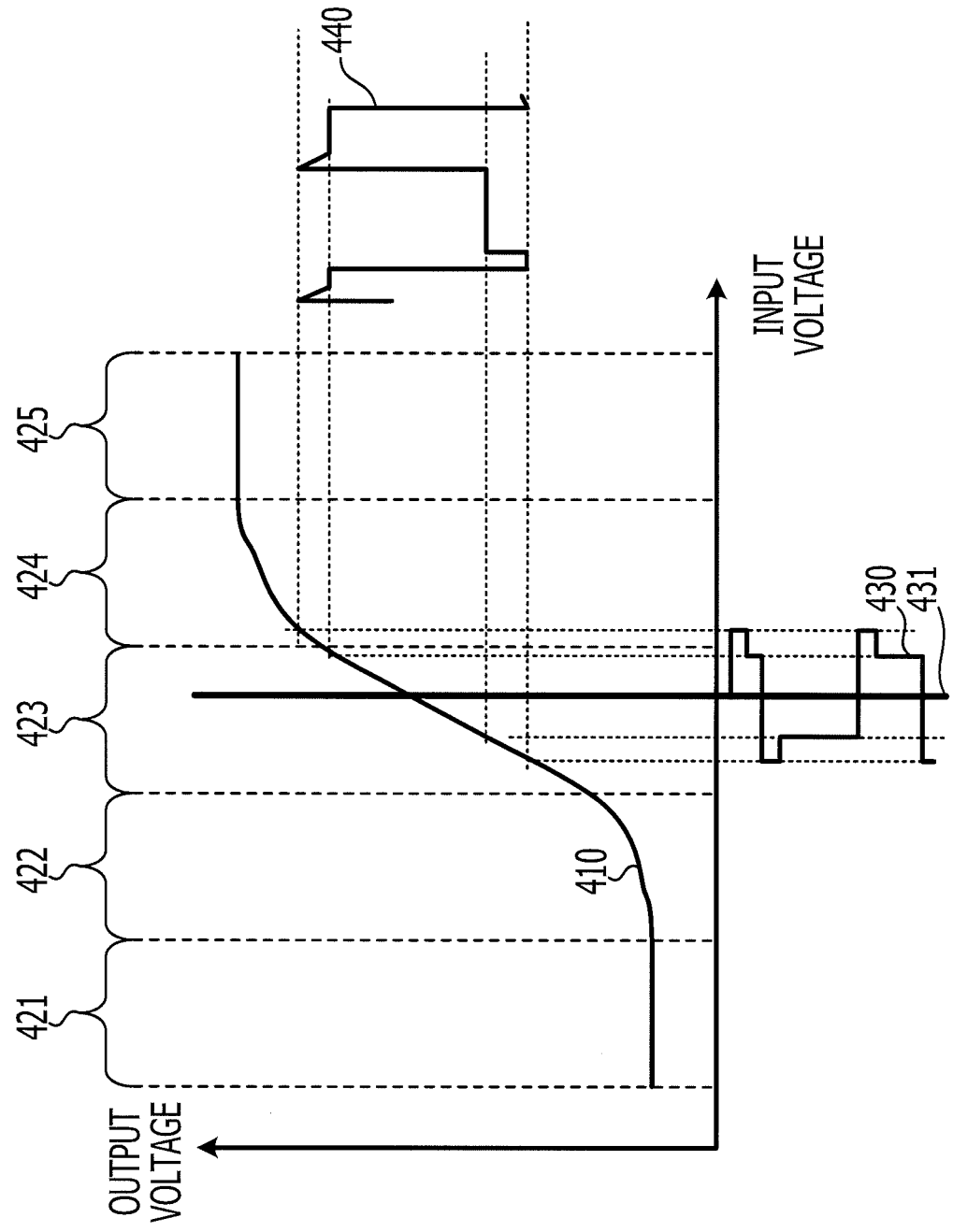

DRIVER AND OPTICAL TRANSMISSION APPARATUS

CROSS-REFERENCE TO RELATED APPLICATIONS

This application is based upon and claims the benefit of priority of the prior Japanese Patent Application No. 2010-183037, filed on Aug. 18, 2010, the entire contents of which are incorporated herein by reference.

BACKGROUND

1. Field

Various embodiments described herein relate to a driver for shaping a drive signal and an optical transmission apparatus.

2. Description of the Related Art

With recent improvement in transmission speed and the increasing capacity of networks, optical signals have been used for short range communications and medium range communications. Photoelectric conversion elements (electrical-optical converters) are employed as light sources for optical signals. The photoelectric conversion elements are compact and consume little power and that allow for direct modulation. Examples of such photoelectric conversion elements include laser diodes (LDs), such as a vertical cavity surface emitting laser (VCSEL).

In cases where an optical signal is transmitted using direct modulation of an LD, the LD is driven by a high-speed electrical signal, so that the electrical signal is converted into a high-speed optical signal. Unfortunately, there are limitations on the high-speed responsivity of the LD itself, and therefore the optical signal is sometimes not sufficiently fast even when the electrical signal is fast. Pre-emphasis is used to compensate for this shortage of high-speed responsivity of an LD. Pre-emphasis emphasizes the rising edge portion (transition from "0" to "1") and the falling edge portion (transition from "1" to "0") of an electrical signal for driving the LD by amplifying the rising edge portion and the falling edge portion in advance.

The specific property of an LD is that the falling edge portion is less steep than the rising edge portion because of the phenomenon of relaxation oscillations. Therefore, in the case of using pre-emphasis of symmetrically (equally) emphasizing the rising edge portion and the falling edge portion of a drive signal, the falling edge portion and the rising edge portion of an optical signal are made asymmetrical, which causes degradation in transmission characteristics. To address this issue, asymmetrical pre-emphasis of amplifying a specific portion of an electrical signal to asymmetrically emphasize its rising edge portion and falling edge portion has been proposed (e.g., see Japanese Unexamined Patent Application Publication No. 2006-40975).

In the aforementioned conventional technique, however, many transistors are used for a circuit that asymmetrically emphasizes the rising edge portion and the falling edge portion, and therefore the gate capacitance is made large. This raises a problem in that a light-emitting element cannot be driven at a high speed. For example, in the aforementioned technique disclosed in Japanese Unexamined Patent Application Publication No. 2006-40975, a circuit for processing a main signal, a circuit for emphasizing the rising edge portion, and a circuit for emphasizing the falling edge portion are used, and thus the number of transistors is large. For this reason, the gate capacitance is large, which makes it impossible to drive a light-emitting element at a high speed.

SUMMARY

In view of such problems, according to an aspect of an embodiment of the present invention a technology is disclosed to provide a driver for shaping a drive signal that includes a pre-emphasis circuit, an offset adjustment circuit, and an amplifier. The pre-emphasis circuit symmetrically emphasizes a rising edge portion and a falling edge portion of the drive signal. The offset adjustment circuit applies a direct-current offset to the drive signal. The amplifier amplifies the drive signal with the direct-current offset adjusted by the adjustment circuit. The amplifier has an input-output characteristic with a nonlinear portion. The offset adjustment circuit adjusts the direct-current offset so that the drive signal is amplified in the nonlinear portion.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4A is a first graph illustrating an input-output characteristic of an amplifier;

FIG. 4B is a second graph illustrating an input-output characteristic of the amplifier;

DETAILED DESCRIPTION

Preferred embodiments of the disclosed technique will be described in detail below with reference to the accompanying drawings.

First Embodiment

Configurations of Signal Shaping Circuit and Optical Transmission Apparatus

Figure 1:
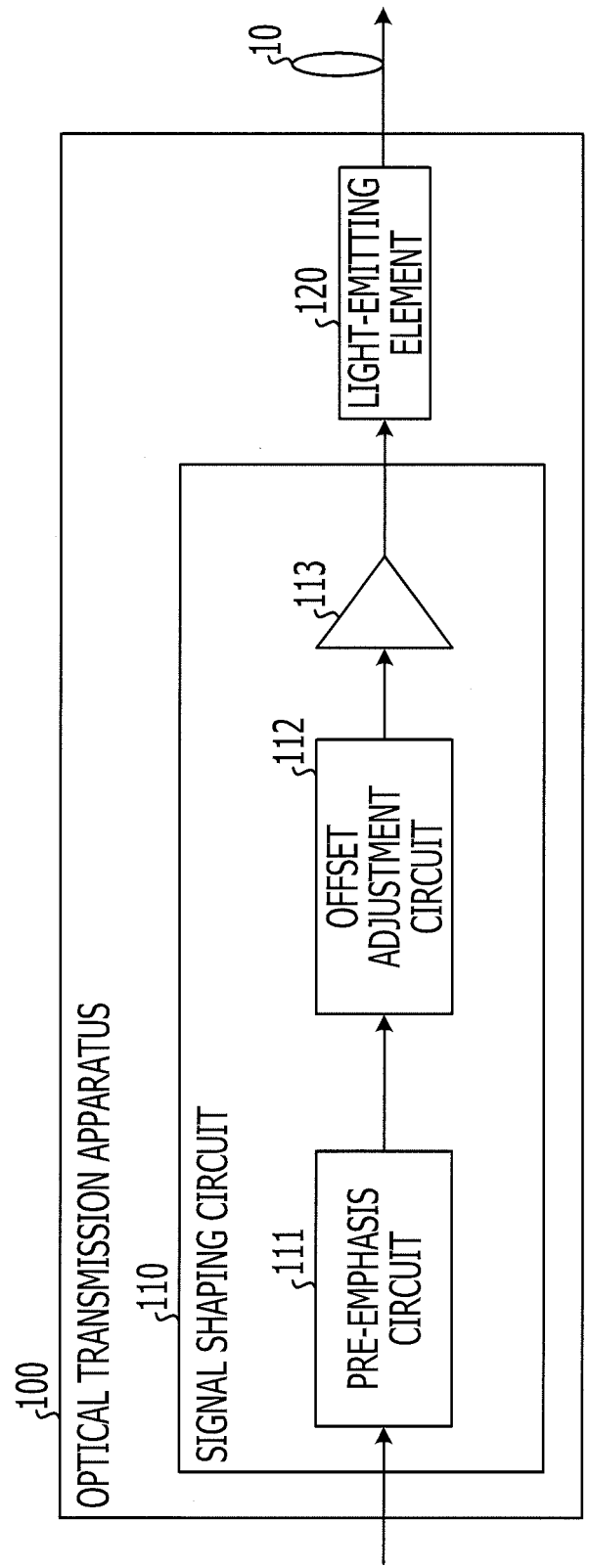
FIG. 1 illustrates a signal shaping circuit and an optical transmission apparatus according to a first embodiment.

FIG. 1 illustrates a signal shaping circuit and an optical transmission apparatus according to a first embodiment. As illustrated in FIG. 1, an optical transmission apparatus 100 according to the first embodiment includes a signal shaping circuit 110 and a light-emitting element 120. The signal shaping circuit 110 shapes drive signals input to the light-emitting element 120 to be driven. Specifically, the signal shaping circuit 110 includes a pre-emphasis circuit 111, an offset adjustment circuit 112, and an amplifier 113.

Drive signals (electrical signals) for the light-emitting element 120 are input to the pre-emphasis circuit 111. The pre-emphasis circuit 111 is an emphasis circuit that performs symmetrical pre-emphasis that symmetrically emphasizes the rising edge portion and the falling edge portion of the input drive signal. As a result of this symmetrical pre-emphasis, the emphasis amount of the rising edge portion of the drive signal is equal to the emphasis amount of the falling edge portion. The pre-emphasis circuit 111 outputs to the offset adjustment circuit 112 the drive signal to which symmetrical pre-emphasis has been applied.

The offset adjustment circuit 112 changes the bias level of the drive signal output from the pre-emphasis circuit 111 to adjust the direct-current (DC) offset of the drive signal. Specifically, the offset adjustment circuit 112 adjusts the DC offset of the drive signal to a value other than zero. This enables a predetermined DC offset to be provided to the drive signal. The offset adjustment circuit 112 outputs to the amplifier 113 the drive signal with the adjusted DC offset.

The amplifier 113 amplifies the drive signal output from the offset adjustment circuit 112. The input-output characteristic of the amplifier 113 has nonlinear portions in which the change of output with respect to input is nonlinear. Accordingly, when the drive signal to which the DC offset has been provided by the offset adjustment circuit 112 is amplified by the amplifier 113, the high potential portion and the low potential portion of the drive signal are asymmetrically amplified (e.g., see FIG. 4B). Therefore, in the drive signal that has been amplified by the amplifier 113, the emphasis amounts of the rising edge portion and the falling edge portion are asymmetrical.

Thus, asymmetrical pre-emphasis that asymmetrically emphasizes the rising edge portion and the falling edge portion of a drive signal can be realized. For example, it is assumed that the DC offset of a drive signal is adjusted to a positive DC offset by the offset adjustment circuit 112. In this case, in the drive signal amplified by the amplifier 113, the falling edge portion is more emphasized than the rising edge portion. The amplifier 113 outputs the amplified drive signal to the light-emitting element 120.

The light-emitting element 120 is disposed after the signal shaping circuit 110. The light-emitting element 120 converts the drive signal output from the signal shaping circuit 110 into an optical signal. The light-emitting element 120 is an LD having limitations in terms of high-speed responsivity, such as a VCSEL. The rising edge portion and the falling edge portion are emphasized in the drive signal output from the signal shaping circuit 110, and therefore a high-speed and high-quality optical signal can be produced by the light-emitting element 120 even though the light-emitting element 120 has limitations in terms of high-speed responsivity.

The light-emitting element 120 has a characteristic, as a specific property of an LD, in that the falling edge portion of an optical signal has a waveform less steep than the rising edge portion because of relaxation oscillations. In contrast, regarding a drive signal output from the signal shaping circuit 110, the falling edge portion is more emphasized than the rising edge portion. As a result of this, the light-emitting element 120 can produce an optical signal in which the waveform of the rising edge portion and the waveform of the falling edge portion are even.

The light-emitting element 120 emits the optical signal obtained by conversion to an optical transmission line 10. This allows the optical transmission apparatus 100 to transmit a high-speed and high-quality optical signal based on the drive signal input to the optical transmission apparatus 100. The optical transmission line 10 is, for example, an optical fiber.

(Specific Example of Pre-Emphasis Circuit)

Figure 2:
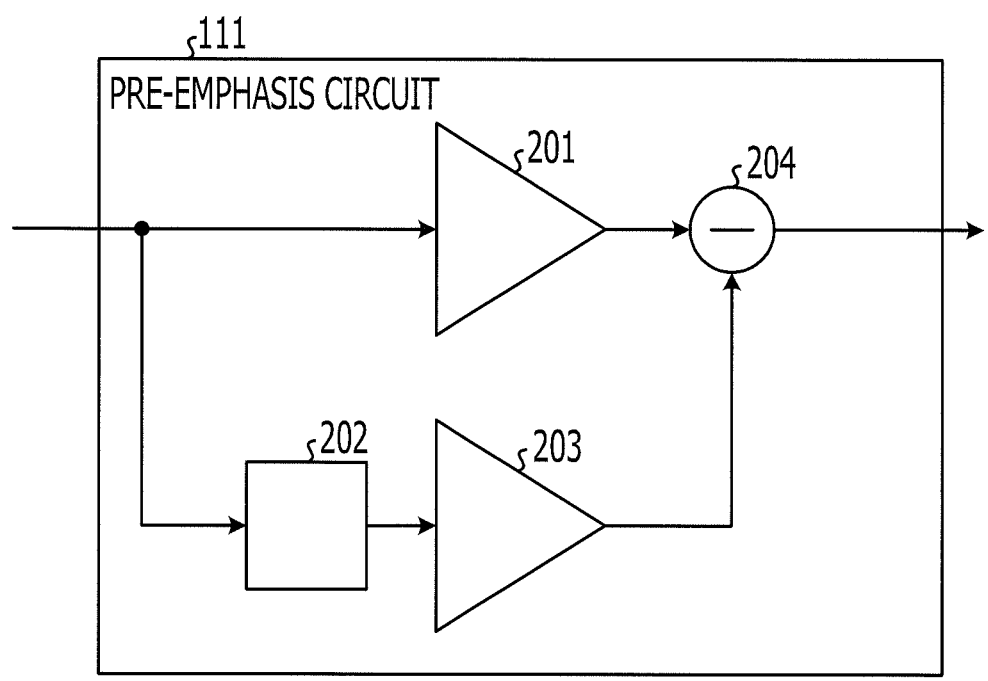
FIG. 2 illustrates a specific example of a pre-emphasis circuit illustrated in FIG. 1.

FIG. 2 illustrates a specific example of the pre-emphasis circuit illustrated in FIG. 1. As illustrated in FIG. 2, the pre-emphasis circuit 111 includes an amplifier 201, a delay 202, an amplifier 203, and a subtractor 204. A drive signal input to the pre-emphasis circuit 111 is branched, and the branched signals are input to the amplifier 201 and the delay 202, respectively.

The amplifier 201 amplifies the input drive signal, and outputs the amplified drive signal to the subtractor 204. The delay 202 delays the input drive signal and outputs the signal to the amplifier 203. The amplifier 203 amplifies the drive signal output from the delay 202 and outputs the amplified drive signal to the subtractor 204. The subtractor 204 performs a subtraction (i.e., adding an inverted signal) between the drive signal output from the amplifier 201 and the drive signal output from the amplifier 203. The subtractor 204 outputs the drive signal obtained by the subtraction to the offset adjustment circuit 112.

In this way, the pre-emphasis circuit 111 can emphasize the rising edge portion and the falling edge portion of the input drive signal and output the signal. By controlling the delay amount in the delay 202, the lengths of emphasized portions of a drive signal can be adjusted. A description has been given here of a configuration in which the delay 202 is provided before the amplifier 203. However, a delay circuit having a delay amount different from that of the delay 202 may further be provided before the amplifier 201.

As such, the pre-emphasis circuit 111 that symmetrically emphasizes the rising edge portion and the falling edge portion of a drive signal can be implemented with a configuration in which a drive signal is branched, a delay difference is provided between the branched drive signals, and the branched drive signals are combined together. The pre-emphasis circuit 111 can therefore be implemented with a simpler configuration than a conventional non-pre-emphasis circuit that asymmetrically emphasizes the rising edge portion and the falling edge portion of a signal.

A description has been given here of a configuration in which a drive signal is branched into two, a delay difference provided between the branched drive signals, and the branched drive signals are combined together. However, the configuration may be such that a drive signal is branched into three or more signals, delay differences are provided among these branched drive signals, and the branched drive signals are combined together. This enables the rising edge portion and the falling edge portion of a drive signal to be emphasized in multiple steps.

(Specific Example of Offset Adjustment Circuit)

Figure 3:
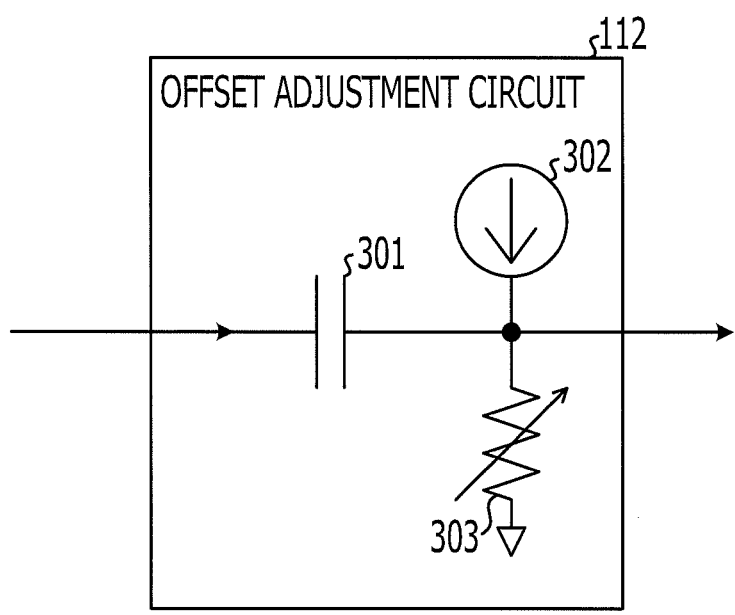
FIG. 3 illustrates a specific example of an offset adjustment circuit illustrated in FIG. 1.

FIG. 3 illustrates a specific example of the offset adjustment circuit illustrated in FIG. 1. As illustrated in FIG. 3, the offset adjustment circuit 112 includes a capacitor 301, a variable current source 302, and a variable resistor 303. The capacitor 301 is connected in series with the signal line of a drive signal. Specifically, the capacitor 301 is connected at one end to the pre-emphasis circuit 111 and at the other end to the amplifier 113. In this way, the direct current (DC) component of a drive signal output from the pre-emphasis circuit 111 is removed. The variable current source 302 and the variable resistor 303 are connected between the capacitor 301 and the amplifier 113.

By changing at least one of the current from the variable current source 302 and the resistance of the variable resistor 303, the DC offset of a drive signal to be output to the amplifier 113 can be adjusted. It is to be noted that the configuration may be such that the variable current source 302 or the variable resistor 303 is omitted. Thus, the offset adjustment circuit 112 can be made up of the capacitor 301 and at least one of the variable resistor 303 and the variable current source 302.

(Input-Output Characteristic of Amplifier)

FIG. 4A and FIG. 4B are graphs illustrating input-output characteristics of the amplifier. In FIG. 4A and FIG. 4B, the horizontal axis represents the input voltage (Vin) of the amplifier 113, and the vertical axis represents the output voltage (Iout) of the amplifier 113. An input-output characteristic 410 is a characteristic of the output voltage with respect to the input voltage of the amplifier 113. The input-output characteristic 410 of the amplifier 113 includes saturation portions (saturation regions) 421 and 425, nonlinear portions (nonlinear regions) 422 and 424, and a linear portion (linear region) 423.

In the saturation portions 421 and 425, the output voltage of the amplifier 113 does not change with a change in input voltage of the amplifier 113. In the nonlinear portions 422 and 424, the output voltage of the amplifier 113 nonlinearly changes with a change in input voltage of the amplifier 113. In the linear portion 423, the output voltage of the amplifier 113 linearly changes with a change in input voltage of the amplifier 113. It is to be noted that the amounts of change in potential in the nonlinear portions 422 and 424 are each smaller than the amount of change in potential in the linear portion 423. The input voltage at the center of the linear portion 423 is zero.

An input signal 430 represents a drive signal input to the amplifier 113. A DC offset 431 represents a DC offset of the input signal 430. The DC offset 431 is adjusted by the offset adjustment circuit 112. An output signal 440 represents a drive signal output from the amplifier 113.

The input signal 430 illustrated in FIG. 4A represents a drive signal input to the amplifier 113 assuming that the DC offset of the drive signal is adjusted to zero in the offset adjustment circuit 112. In this case, as the output signal 440 illustrated in FIG. 4A, the emphasis amounts of the rising edge portion and the falling edge portion of a drive signal output from the amplifier 113 remain symmetrical.

The input signal 430 illustrated in FIG. 4B represents a drive signal input to the amplifier 113 in the case where the DC offset of the drive signal is adjusted to be larger than zero in the offset adjustment circuit 112. Here, owing to the DC offset 431 of the input signal 430, the rising edge portion of the input signal 430 is included in the nonlinear portion 424, and the falling edge portion of the input signal 430 is included in the linear portion 423.

In this case, the amount of amplification of the rising edge portion of the input signal 430 is smaller than the amount of amplification of the falling edge portion. Therefore, as the output signal 440 illustrated in FIG. 4B, the falling edge portion can be more emphasized than the rising edge portion of a drive signal output from the amplifier 113. As such, the DC offset 431 is adjusted so that the rising edge portion of the input signal 430 is included in the nonlinear portion 424, which enables the falling edge portion of the drive signal to be more emphasized than the rising edge portion.

Figure 4C:
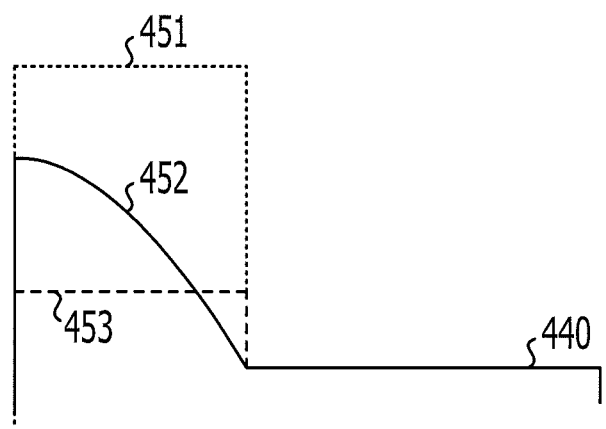
FIG. 4C is an enlarged graph of a rising edge portion of an output signal of the amplifier.

FIG. 4C is an enlarged graph of the rising edge portion of the output signal of the amplifier. Each of rising edge portions 451 to 453 illustrated in FIG. 4C is an individual rising edge portion of the output signal 440. Specifically, the rising edge portion 451 is the rising edge portion of the output signal 440 assuming that the rising edge portion of the input signal 430 is included in the linear portion 423 (see FIG. 4A). In this case, the rising edge portion 451 is emphasized in such a manner that the rising edge portion 451 and the falling edge portion are symmetrically emphasized.

The rising edge portion 452 is the rising edge portion of the output signal 440 in the case where the rising edge portion of the input signal 430 is included in the nonlinear portion 424

(see FIG. 4B). In this case, the rising edge portion 452 is moderately amplified. In this way, the falling edge portion of the output signal 440 can be more emphasized than its rising edge portion.

The rising edge portion 453 is the rising edge portion of the output signal 440 assuming that the input-output characteristic of the amplifier 113 has a minimum nonlinear portion and that the rising edge portion of the input signal 430 is included in the saturation portion 425. In this case, the rising edge portion of the input signal 430 is not amplified, and therefore the emphasized portion of the rise of the output signal 440 is relatively small in the output signal 440.

Also in this case, the falling edge portion of the output signal 440 can be more emphasized than its rising edge portion. In the case of the rising edge portion 453, however, emphasis effects are sometimes not obtained. It is therefore more desirable that the rising edge portion of the input signal 430 be included in the nonlinear portion 424 (the rising edge portion 452).

(Exemplary Waveforms)

Figure 5A:
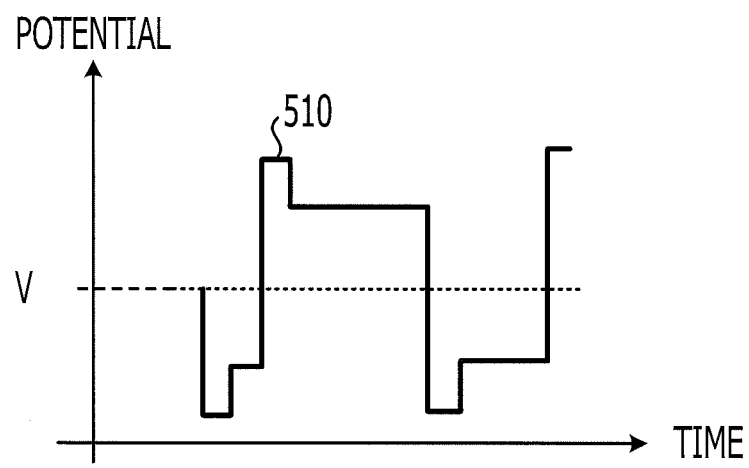
FIG. 5A is a first chart illustrating an exemplary waveform of a drive signal.
Figure 5B:
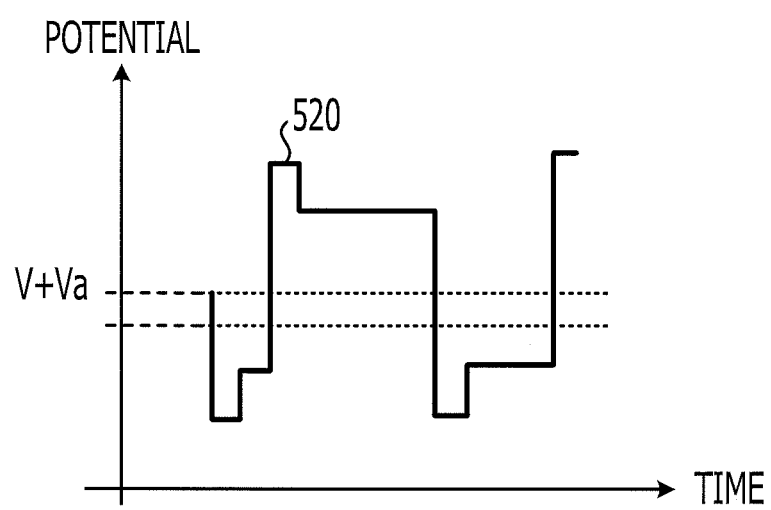
FIG. 5B is a second chart illustrating an exemplary waveform of a drive signal.
Figure 5C:
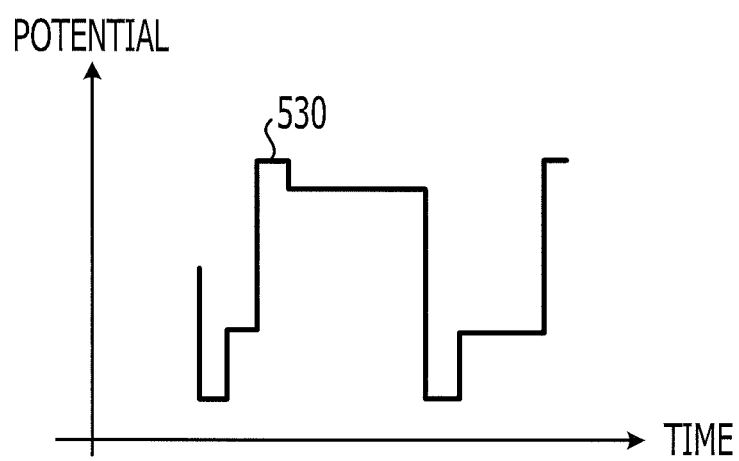
FIG. 5C is a third chart illustrating an exemplary waveform of a drive signal.

FIG. 5A to FIG. 5C are charts illustrating exemplary waveforms of drive signals. In FIG. 5A to FIG. 5C, the horizontal axis represents time, and the vertical axis represents the potential. A drive signal 510 illustrated in FIG. 5A represents a drive signal output from the pre-emphasis circuit 111. The DC offset of the drive signal 510 is assumed to be V (e.g., V=0). As illustrated in FIG. 5A, regarding the drive signal 510, the rising edge portion and the falling edge portion are symmetrically emphasized.

A drive signal 520 illustrated in FIG. 5B represents a drive signal output from the offset adjustment circuit 112. As illustrated in FIG. 5B, here, it is assumed that the offset adjustment circuit 112 has adjusted the DC offset of the drive signal 520 to V+Va (Va>0). It is also assumed that the rising edge portion of the drive signal 520 enters a nonlinear portion of the input-output characteristic of the amplifier 113 (see FIG. 4B).

A drive signal 530 illustrated in FIG. 5C represents a drive signal output from the amplifier 113. The rising edge portion of the drive signal 520 input to the amplifier 113 enters a nonlinear portion of the input-output characteristic of the amplifier 113, and therefore, as illustrated in FIG. 5C, the drive signal 530 has a waveform in which the falling edge portion is more emphasized than the rising edge portion.

Figure 6A:
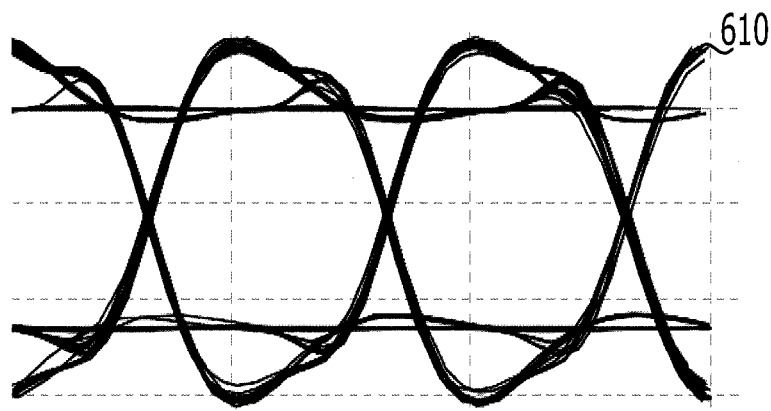
FIG. 6A is a first chart illustrating an exemplary eye pattern of a drive signal.
Figure 6B:
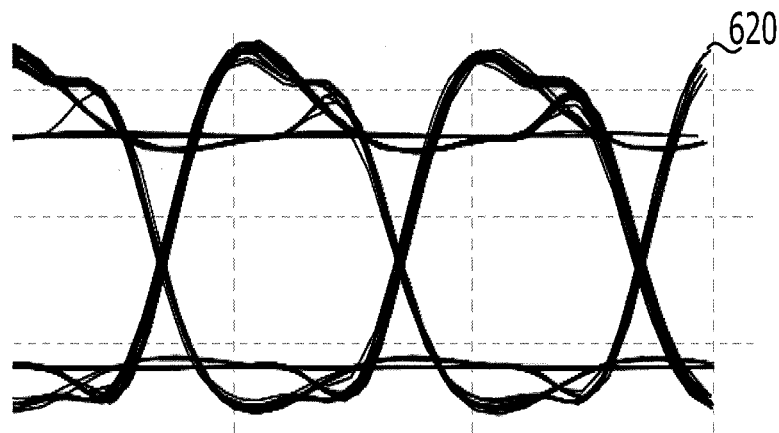
FIG. 6B is a second chart illustrating an exemplary eye pattern of a drive signal.
Figure 6C:
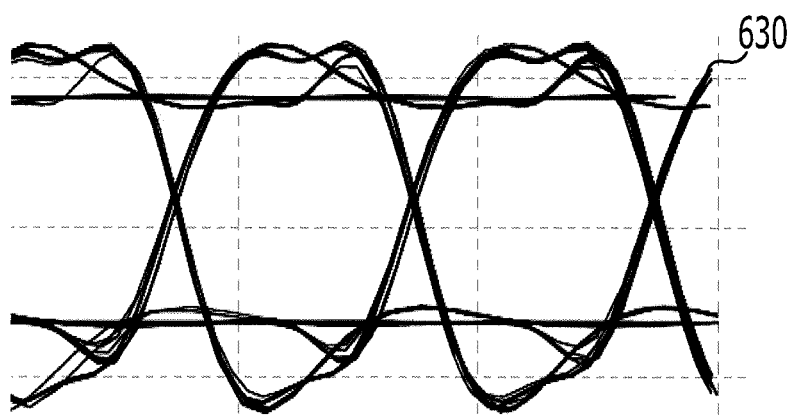
FIG. 6C is a third chart illustrating an exemplary eye pattern of a drive signal.

FIG. 6A to FIG. 6C are charts illustrating exemplary eye patterns of drive signals. An eye pattern 610 illustrated in FIG. 6A shows a drive signal output from the pre-emphasis circuit 111. As shown in the eye pattern 610, regarding the drive signal output from the pre-emphasis circuit 111, the rising edge portion and the falling edge portion are symmetrically emphasized.

An eye pattern 620 illustrated in FIG. 6B shows a drive signal output from the amplifier 113 in the case where the DC offset of the drive signal is adjusted to a value less than zero so that the falling edge portion of the drive signal is included in the nonlinear portion 422 of the input-output characteristic of the amplifier 113. As shown in the eye pattern 620, in this case, a drive signal in which the rising edge portion is more emphasized than the falling edge portion is output from the amplifier 113.

An eye pattern 630 illustrated in FIG. 6C shows a drive signal output from the amplifier 113 in the case where the DC offset of the drive signal is adjusted to a value larger than zero so that the rising edge portion of the drive signal is included in the nonlinear portion 424 of the input-output characteristic of the amplifier 113. As shown in the eye pattern 630, in this case, a drive signal in which the falling edge portion is more emphasized than the rising edge portion is output from the amplifier 113.

As described above, with the signal shaping circuit 110 according to the first embodiment, a DC offset is provided to a drive signal whose rising edge portion and falling edge portion are symmetrically emphasized, and the drive signal is amplified by the amplifier 113, which enables the rising edge portion and the falling edge portion of the drive signal to be made asymmetrical. Thus, asymmetrical pre-emphasis can be implemented with a simple configuration, which makes it possible to compensate for limited high-speed responsivities to achieve even high-speed responsivities of the rising edge portion and the falling edge portion of a signal in a light-emitting element. The asymmetrical pre-emphasis can be implemented with a simple configuration, and therefore the number of transistors can be decreased. This can result in a reduction in parasitic gate capacitance to enable high-speed driving.

Second Embodiment

Configurations of Signal Shaping Circuit and Optical Transmission Apparatus

Figure 7:
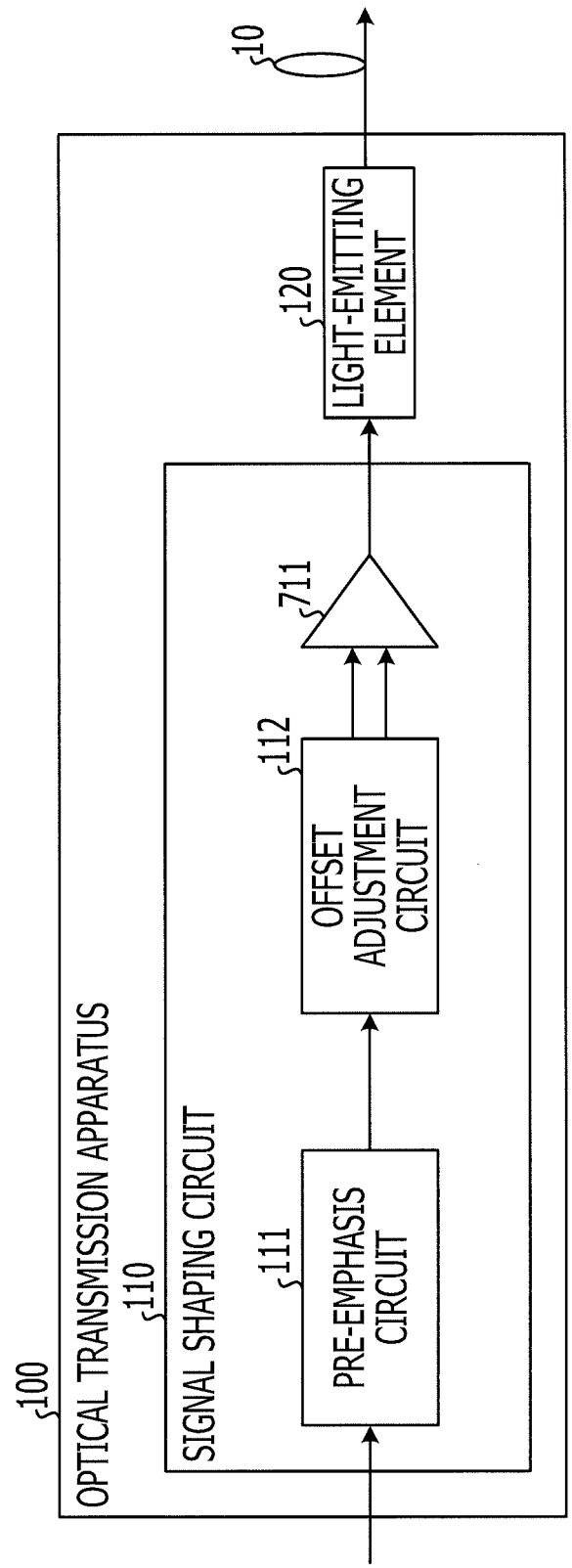
FIG. 7 illustrates a signal shaping circuit and an optical transmission apparatus according to a second embodiment.

FIG. 7 illustrates a signal shaping circuit and an optical transmission apparatus according to a second embodiment. In FIG. 7, configurations similar to those illustrated in FIG. 1 are indicated by the same reference characters, and the corresponding descriptions are omitted. As illustrated in FIG. 7, the signal shaping circuit 110 according to the second embodiment includes a differential amplifier 711 in place of the amplifier 113 illustrated in FIG. 1. The offset adjustment circuit 112 adjusts the DC offset of a drive signal from the pre-emphasis circuit 111 and outputs the drive signal to the differential amplifier 711, and also outputs a constant voltage with the adjusted DC offset to the differential amplifier 711.

The input-output characteristic of the differential amplifier 711 has nonlinear portions in which the change of output with respect to input is nonlinear. The differential amplifier 711 differentially amplifies the drive signal and the constant voltage that have been output from the offset adjustment circuit 112. This enables one-side driving of the differential amplifier 711. The differential amplifier 711 outputs the drive signal obtained by the differential amplification to the light-emitting element 120.

(Specific Example of Pre-Emphasis Circuit)

A specific example of the pre-emphasis circuit 111 illustrated in FIG. 7 is similar to the pre-emphasis circuit 111 illustrated in FIG. 2.

(Specific Example of Offset Adjustment Circuit)

Figure 8:
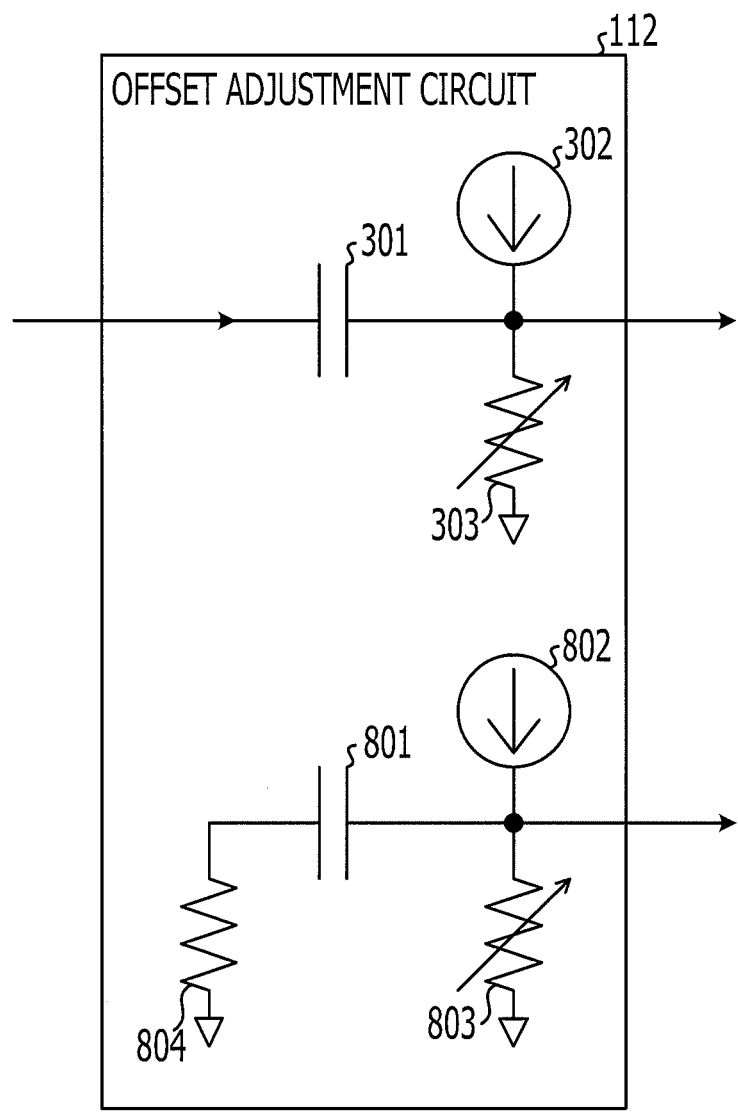
FIG. 8 illustrates a specific example of an offset adjustment circuit illustrated in FIG. 7.

FIG. 8 illustrates a specific example of the offset adjustment circuit illustrated in FIG. 7. In FIG. 8, configurations similar to those illustrated in FIG. 3 are indicated by the same reference characters, and the corresponding descriptions are omitted. As illustrated in FIG. 8, the offset adjustment circuit 112 includes, in addition to the configuration illustrated in FIG. 3, a capacitor 801, a variable current source 802, a variable resistor 803, and a resistor 804.

The capacitor 801 is connected in series with the line of a constant voltage. Specifically, the capacitor 801 is connected at one end to the resistor 804 and at the other end to the differential amplifier 711. The variable current source 802 and the variable resistor 803 are connected between the capacitor 801 and the differential amplifier 711. By changing at least one of the current of the variable current source 802 and the resistance of the variable resistor 803, the DC offset of a constant voltage to be output to the differential amplifier 711 can be adjusted.

It is to be noted that the configuration may be such that either the variable current source 802 or the variable resistor 803 is omitted. The configuration may also be such that, in place of the capacitor 801, the variable current source 802, the variable resistor 803, and the resistor 804, for example, a fixed current source that outputs a constant voltage to the differential amplifier 711 is provided, and adjustment of the DC offset of the constant voltage is not performed.

(Input-Output Characteristic of Differential Amplifier)

The input-output characteristics of the differential amplifier 711 are similar to those of the amplifier 113 illustrated in FIG. 4A to FIG. 4C.

(Exemplary Waveforms)

Figure 9A:
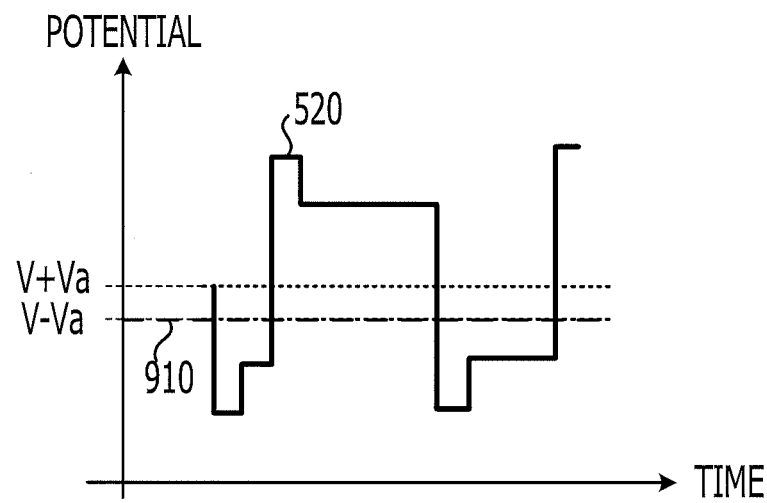
FIG. 9A is a first chart illustrating an exemplary waveform of a drive signal and a constant voltage.
Figure 9B:
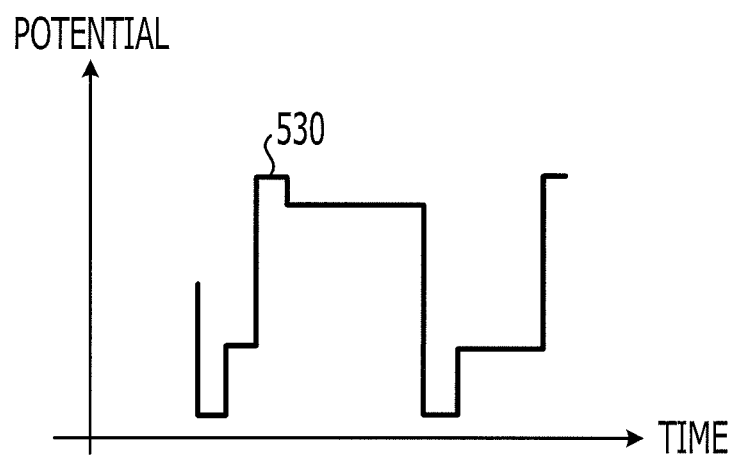
FIG. 9B is a second chart illustrating an exemplary waveform of a drive signal and a constant voltage.

FIG. 9A and FIG. 9B are charts illustrating exemplary waveforms of drive signals and constant voltages. In FIG. 9A and FIG. 9B, portions similar to those illustrated in FIG. 5B and FIG. 5C are indicated by the same reference characters, and the corresponding descriptions are omitted. A drive signal output from the pre-emphasis circuit 111 is similar to the drive signal 510 illustrated in FIG. 5A.

A constant voltage 910 illustrated in FIG. 9A represents a constant voltage output from the offset adjustment circuit 112. As illustrated in FIG. 9A, here, it is assumed that the offset adjustment circuit 112 has adjusted the DC offset of the drive signal 520 to V+Va and has adjusted the DC offset of the constant voltage 910 to V−Va. It is also assumed that the rising edge portion of the drive signal 520 enters a nonlinear portion of the input-output characteristic of the differential amplifier 711 (see FIG. 4B).

The drive signal 530 illustrated in FIG. 9B represents a drive signal output from the differential amplifier 711. The rising edge portion of the drive signal 520 input to the differential amplifier 711 enters a nonlinear portion of the input-output characteristic of the differential amplifier 711, and therefore, as illustrated in FIG. 9B, the drive signal 530 has a waveform in which the falling edge portion is more emphasized than the rising edge portion.

The drive signal 530 illustrated in FIG. 9B is a signal obtained by differential amplification of the drive signal 520 and the constant voltage 910 illustrated in FIG. 9A, and therefore the potential of the drive signal 530 in general is lower than that of the drive signal 530 illustrated in FIG. 5C. In this way, the potential of the drive signal 530 illustrated in FIG. 9B can be changed by adjustment of the DC offset of the constant voltage 910 using the offset adjustment circuit 112.

Figure 10A:
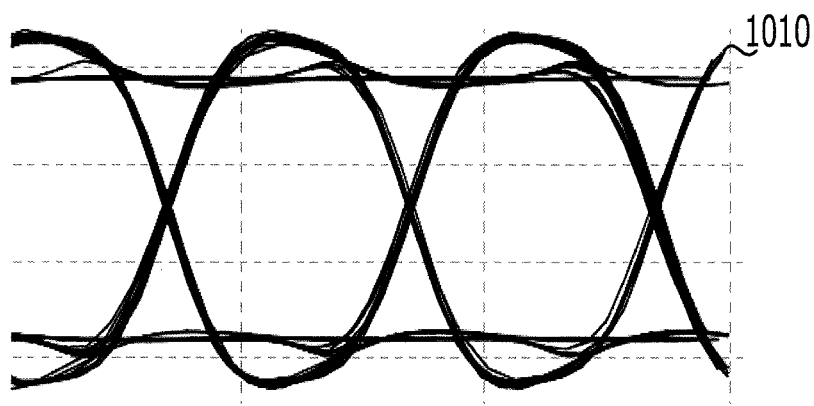
FIG. 10A is a first chart illustrating an exemplary eye pattern of a drive signal.
Figure 10B:
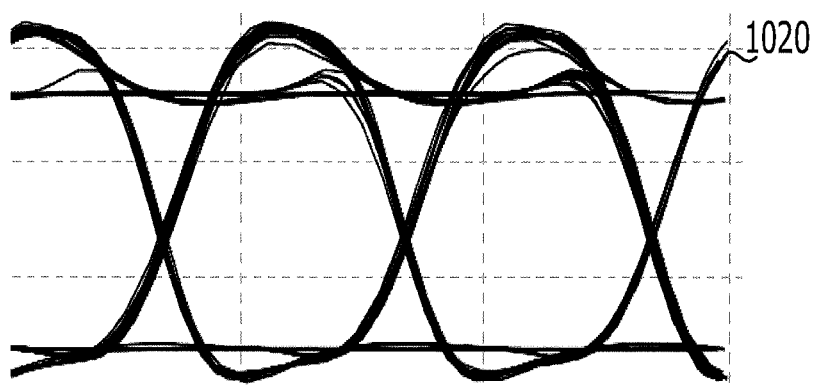
FIG. 10B is a second chart illustrating an exemplary eye pattern of a drive signal.
Figure 10C:
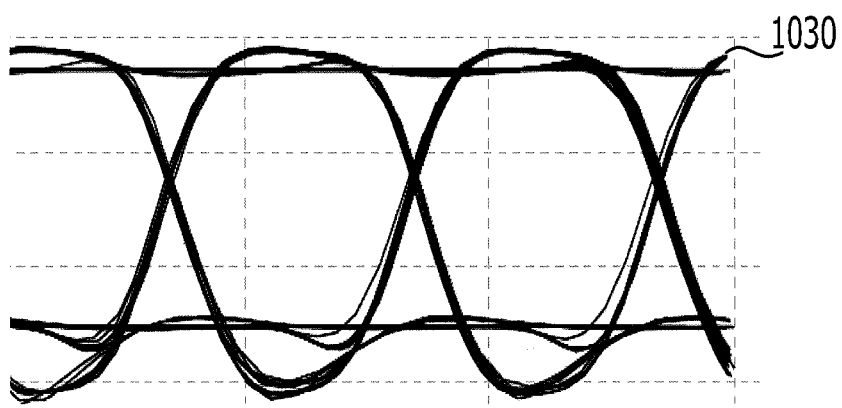
FIG. 10C is a third chart illustrating an exemplary eye pattern of a drive signal.

FIG. 10A to FIG. 10C are charts illustrating exemplary eye patterns of drive signals. An eye pattern 1010 illustrated in FIG. 10A shows a drive signal output from the pre-emphasis circuit 111. As shown in the eye pattern 1010, regarding the drive signal output from the pre-emphasis circuit 111, the rising edge portion and the falling edge portion are symmetrically emphasized.

An eye pattern 1020 illustrated in FIG. 10B shows a drive signal output from the differential amplifier 711 in the case where the drive signal is adjusted according to a negative DC offset so that the falling edge portion of the drive signal is included in the nonlinear portion 422 of the input-output characteristic of the differential amplifier 711. As shown in the eye pattern 1020, in this case, a drive signal in which the rising edge portion is more emphasized than the falling edge portion is output from the differential amplifier 711.

An eye pattern 1030 illustrated in FIG. 10O shows a drive signal output from the differential amplifier 711 in the case where the drive signal is adjusted according to a positive DC offset so that the rising edge portion of the drive signal is included in the nonlinear portion 424 of the input-output characteristic of the differential amplifier 711. As shown in the eye pattern 1030, in this case, a drive signal in which the falling edge portion is more emphasized than the rising edge portion is output from the differential amplifier 711.

As described above, with the signal shaping circuit 110 according to the second embodiment, similar effects to those of the signal shaping circuit 110 according to the first embodiment can be obtained with a configuration in which the differential amplifier 711 is used by one-side driving.

Third Embodiment

Configurations of Signal Shaping Circuit and Optical Transmission Apparatus

Figure 11:
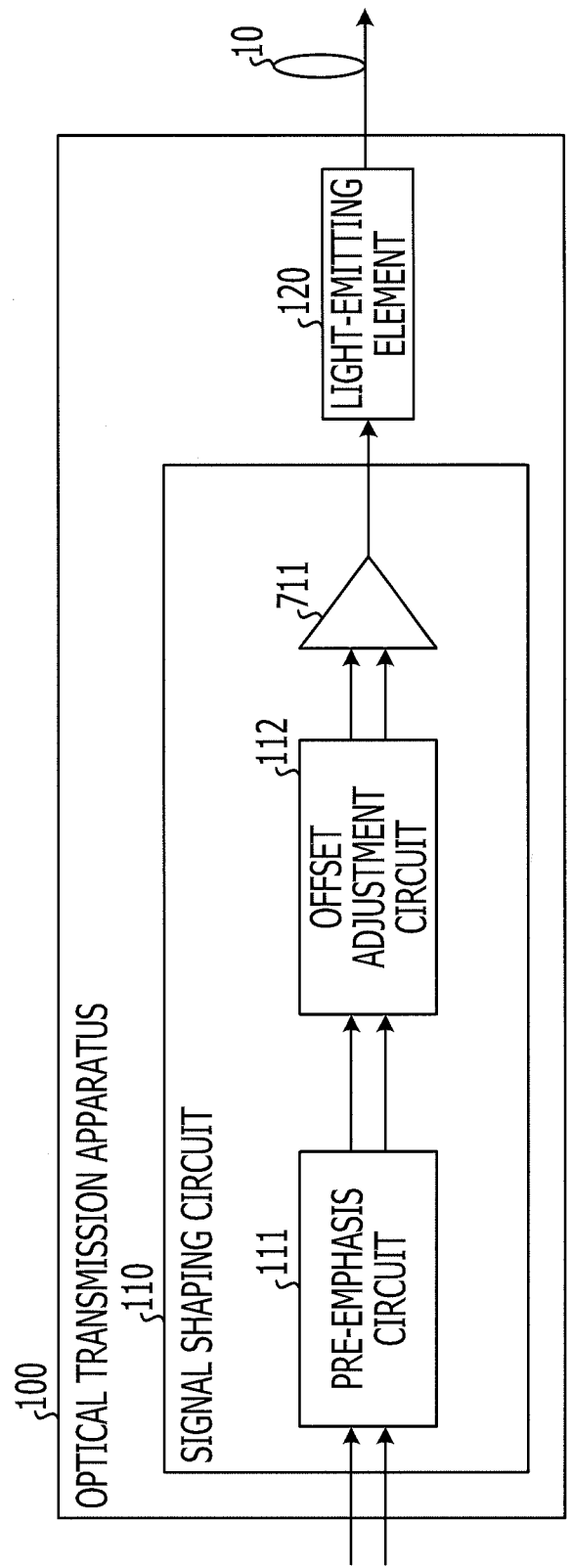
FIG. 11 illustrates a signal shaping circuit and an optical transmission apparatus according to a third embodiment.

FIG. 11 illustrates a signal shaping circuit and an optical transmission apparatus according to a third embodiment. In FIG. 11, configurations similar to those illustrated in FIG. 7 are indicated by the same reference characters, and the corresponding descriptions are omitted. As illustrated in FIG. 11, a differential signal including a normal phase signal and a reverse phase signal, as a drive signal of the light-emitting element 120, is input to the signal shaping circuit 110 according to the third embodiment.

The pre-emphasis circuit 111 symmetrically emphasizes the rising edge portion and the falling edge portion for each of the normal phase signal and the reverse phase signal that have been input. The offset adjustment circuit 112 adjusts the DC offsets of the normal phase signal and the reverse phase signal that have been output from the pre-emphasis circuit 111, and outputs the signals to the differential amplifier 711. The differential amplifier 711 performs differential amplification based on the normal phase signal and the reverse phase signal output from the offset adjustment circuit 112.

(Specific Example of Pre-Emphasis Circuit)

Figure 12:
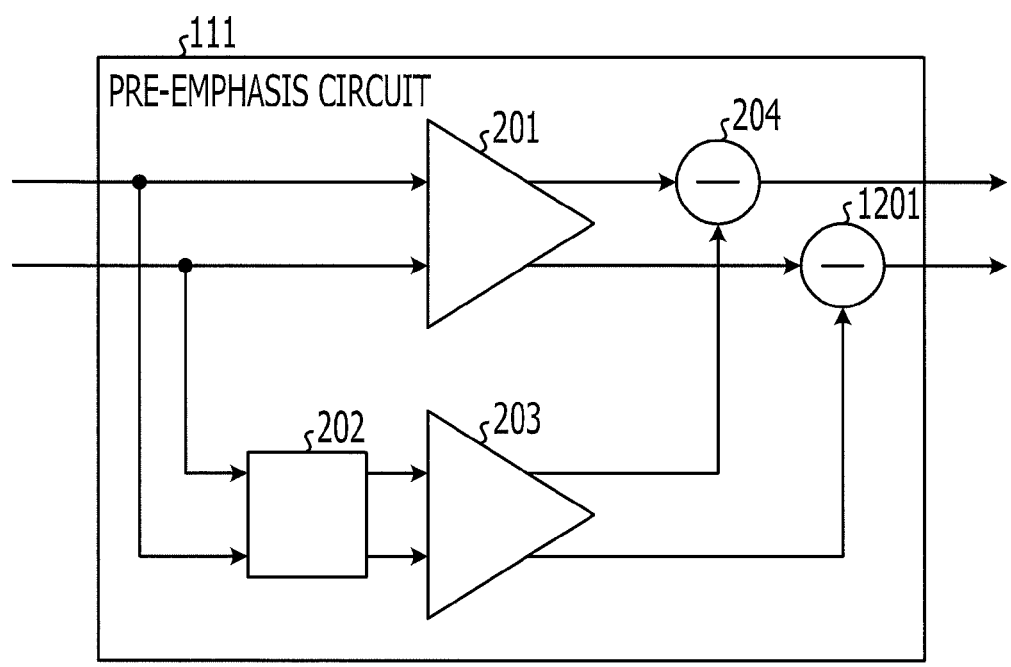
FIG. 12 illustrates a specific example of a pre-emphasis circuit illustrated in FIG. 11.

FIG. 12 illustrates a specific example of the pre-emphasis circuit illustrated in FIG. 11. In FIG. 12, configurations similar to those illustrated in FIG. 2 are indicated by the same reference characters, and the corresponding descriptions are omitted. As illustrated in FIG. 12, the pre-emphasis circuit 111 includes, in addition to the configuration illustrated in FIG. 2, a subtractor 1201. A normal phase signal input to the pre-emphasis circuit 111 is branched, and the branched normal phase signals are input to the amplifier 201 and the delay 202, respectively. A reverse phase signal input to the pre-emphasis circuit 111 is branched, and the branched reverse phase signals are input to the amplifier 201 and the delay 202, respectively.

The amplifier 201 amplifies the normal phase signal and the reverse phase signal that have been input. The amplifier 201 outputs the amplified normal phase signal to the subtractor 204, and outputs the amplified reverse phase signal to the subtractor 1201. The delay 202 delays the normal phase signal and the reverse phase signal that have been input, and outputs the signals to the amplifier 203. The amplifier 203 amplifies the normal phase signal and the reverse phase signal that have been output from the delay 202. The amplifier 203 outputs the amplified normal phase signal to the subtractor 204, and outputs the amplified reverse phase signal to the subtractor 1201.

The subtractor 204 performs a subtraction (i.e., adding an inverted signal) between the normal phase signal output from the amplifier 201 and the normal phase signal output from the amplifier 203. The subtractor 204 outputs the normal phase signal obtained by the subtraction to the offset adjustment circuit 112. The subtractor 1201 performs a subtraction (i.e., adding an inverted signal) between the reverse phase signal output from the amplifier 201 and the reverse phase signal output from the amplifier 203. The subtractor 1201 outputs the reverse phase signal obtained by the subtraction to the offset adjustment circuit 112. In this way, the pre-emphasis circuit 111 can emphasize the rising edge portion and the falling edge portion of each of the normal phase signal and the reverse phase signal that have been input, and can output the signals.

(Specific Example of Offset Adjustment Circuit)

Figure 13:
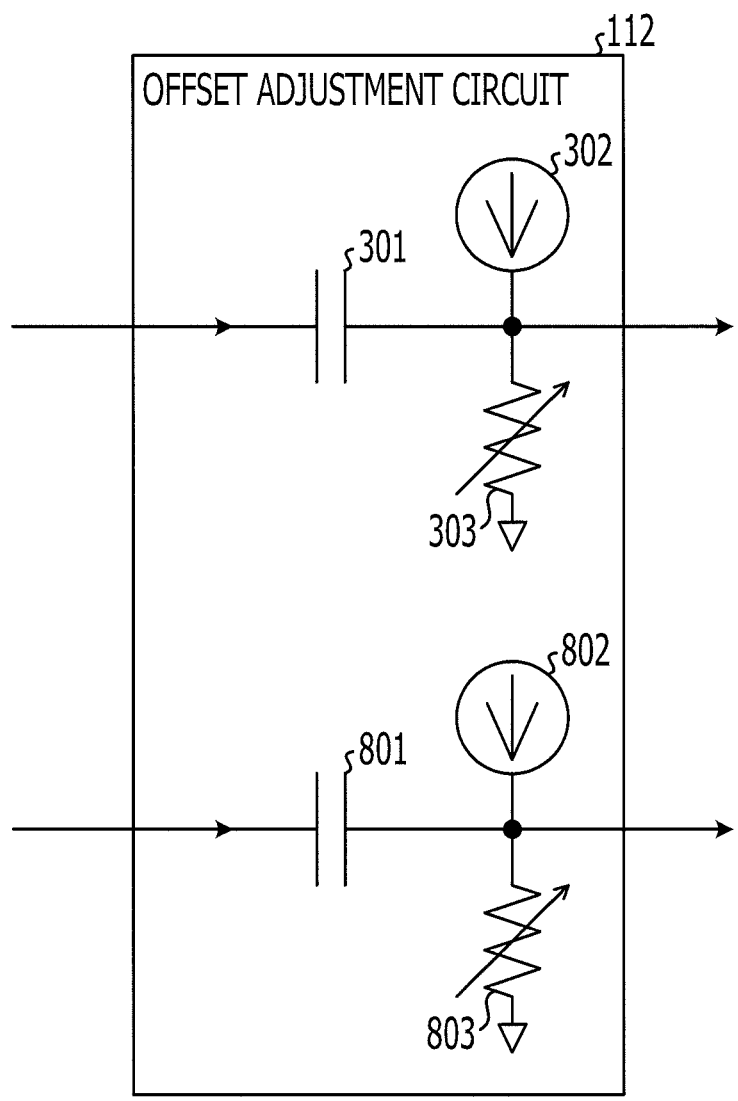
FIG. 13 illustrates a specific example of an offset adjustment circuit illustrated in FIG. 11.

FIG. 13 illustrates a specific example of the offset adjustment circuit illustrated in FIG. 11. In FIG. 13, configurations similar to those illustrated in FIG. 8 are indicated by the same reference characters, and the corresponding descriptions are omitted. The capacitor 301 of the offset adjustment circuit 112 is connected at one end to the subtractor 204 of the offset adjustment circuit 112 and at the other end to the differential amplifier 711. In this way, the DC offset of a normal phase signal output from the offset adjustment circuit 112 can be adjusted.

The capacitor 801 is connected at one end to the subtractor 1201 of the offset adjustment circuit 112 and at the other end to the differential amplifier 711. In this case, the resistor 804 illustrated in FIG. 8 may be omitted. In this way, the DC offset of a reverse phase signal output from the offset adjustment circuit 112 can be adjusted.

(Input-Output Characteristic of Differential Amplifier)

Figure 14A:
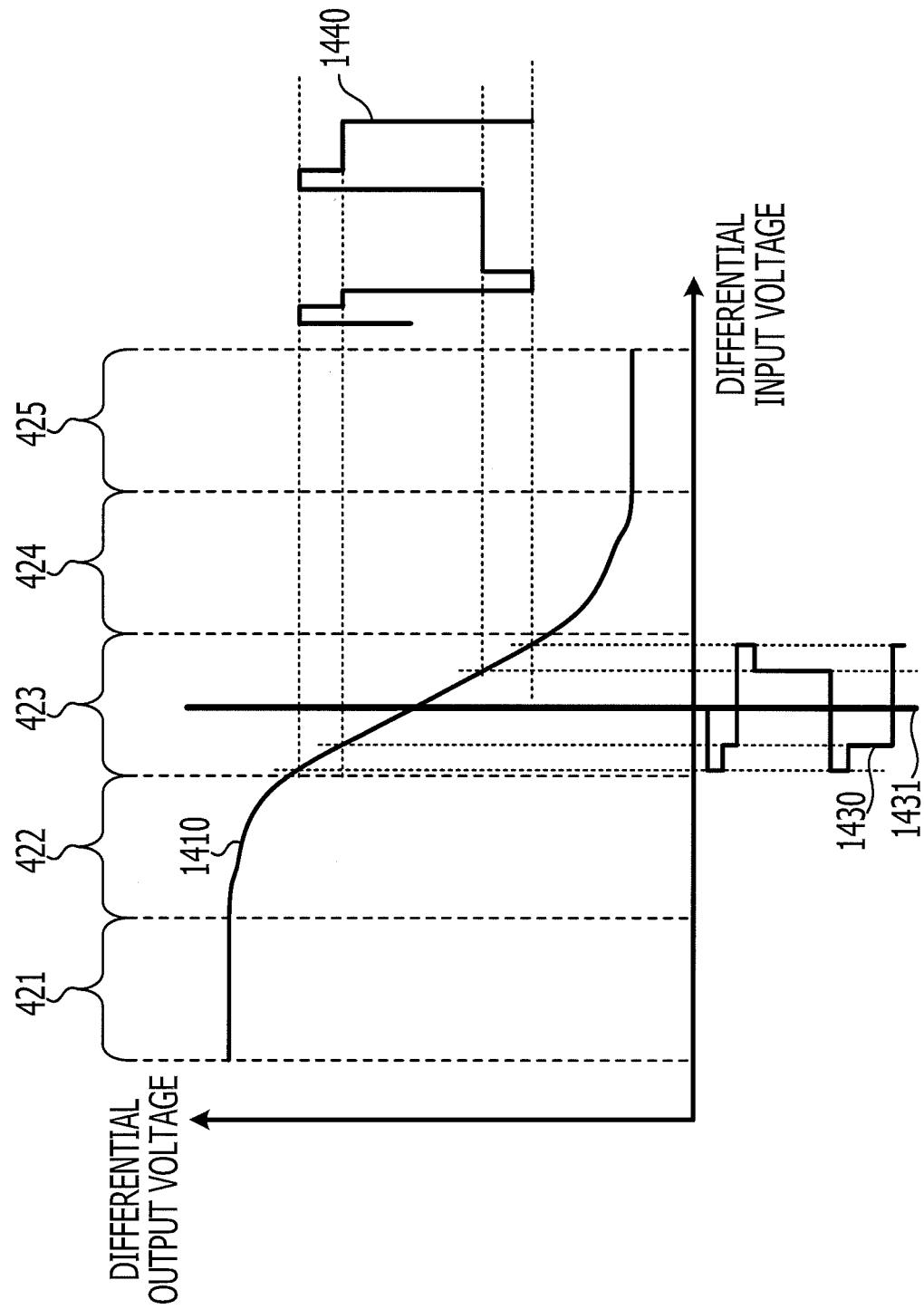
FIG. 14A is a first graph illustrating an input-output characteristic of a differential amplifier.
Figure 14B:
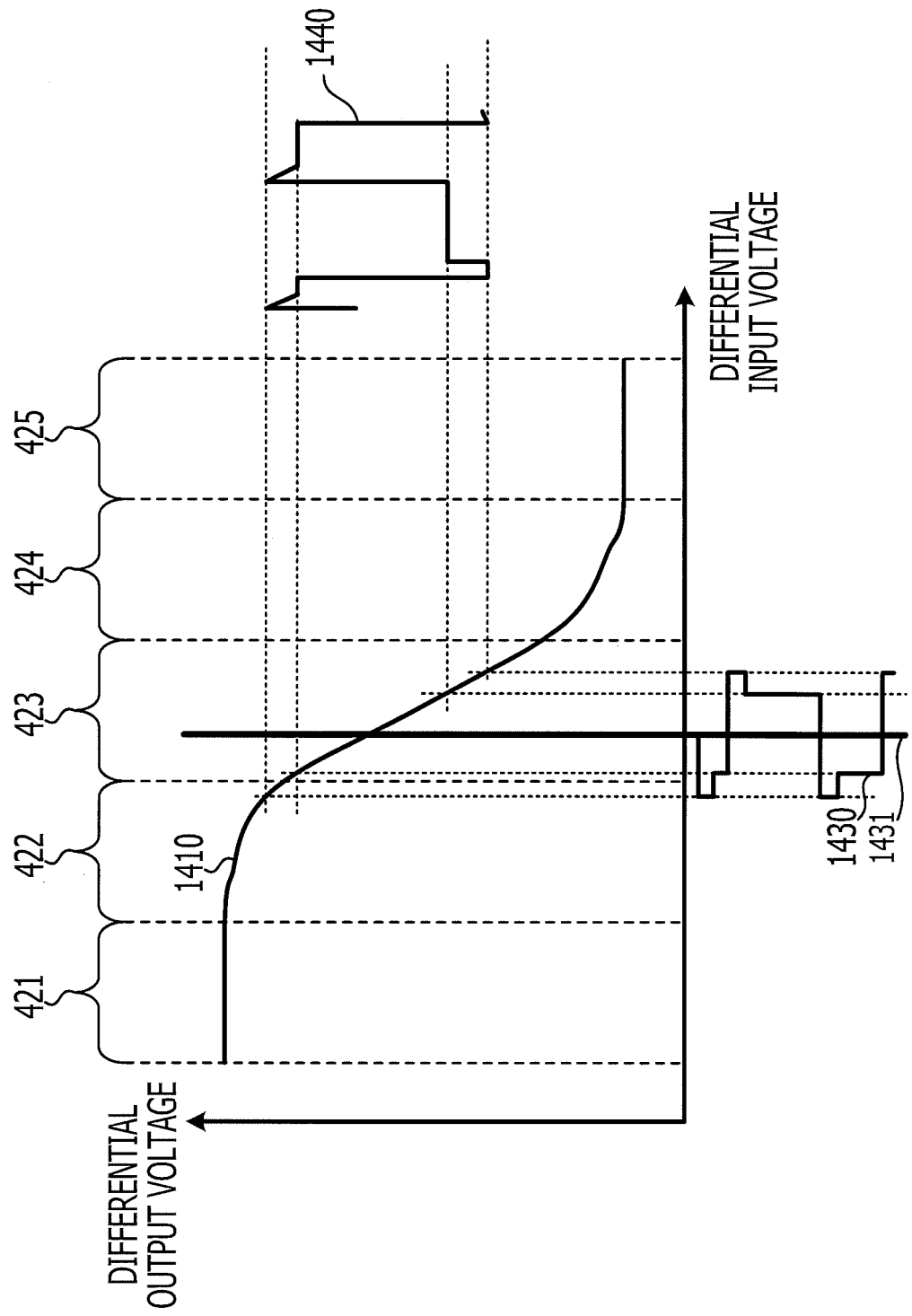
FIG. 14B is a second graph illustrating an input-output characteristic of the differential amplifier.

FIG. 14A and FIG. 14B are graphs illustrating input-output characteristics of the differential amplifier. In FIG. 14A and FIG. 14B, portions similar to those illustrated in FIG. 4A and FIG. 4B are indicated by the same reference characters, and the corresponding descriptions are omitted. An input-output characteristic 1410 is a characteristic of the differential output voltage with respect to the differential input voltage of the differential amplifier 711. The input-output characteristic 1410 of the differential amplifier 711 includes the saturation portions 421 and 425, the nonlinear portions 422 and 424, and the linear portion 423.

An input signal 1430 represents a differential signal based on a normal phase signal and a reverse phase signal input to the differential amplifier 711. A DC offset 1431 represents a DC offset of the input signal 1430. The DC offset 1431 is adjusted by the offset adjustment circuit 112. An output signal 1440 represents a drive signal output from the differential amplifier 711.

The input signal 1430 illustrated in FIG. 14A represents a drive signal input to the differential amplifier 711 assuming that the DC offsets of the normal phase signal and the reverse phase signal are adjusted to zero in the offset adjustment circuit 112. In this case, as the output signal 1440 illustrated in FIG. 14A, the emphasis amounts of the rising edge portion and the falling edge portion of the drive signal output from the differential amplifier 711 remain symmetrical.

The input signal 1430 illustrated in FIG. 14B represents a drive signal input to the differential amplifier 711 in the case where, in the offset adjustment circuit 112, the normal phase signal is adjusted according to a positive DC offset, and the reverse phase signal is adjusted according to a negative DC offset. Here, owing to the DC offset 1431 of the input signal 1430, the rising edge portion of the input signal 1430 is included in the nonlinear portion 424. The falling edge portion of the input signal 1430 is included in the linear portion 423.

In this case, the amount of amplification of the rising edge portion of the input signal 1430 is smaller than the amount of amplification of the falling edge portion. Therefore, as the output signal 1440 illustrated in FIG. 14B, the falling edge portion can be more emphasized than the rising edge portion in a drive signal output from the differential amplifier 711. As such, the normal phase signal is adjusted according to a positive DC offset, and the reverse phase signal is adjusted according to a negative DC offset, which enables the falling edge portion of a drive signal to be more emphasized than the rising edge portion.

(Exemplary Waveforms)

Figure 15A:
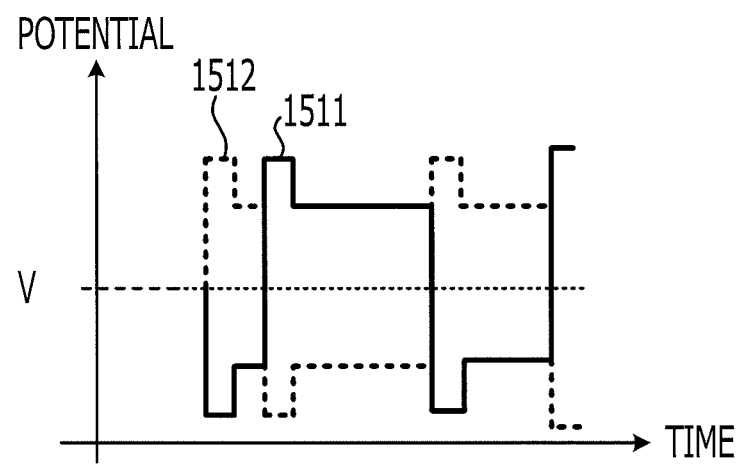
FIG. 15A is a first chart illustrating an exemplary waveform of a drive signal.
Figure 15B:
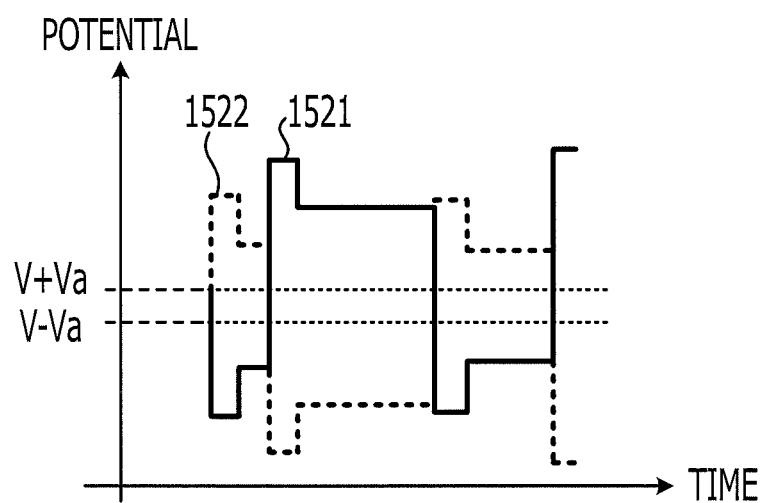
FIG. 15B is a second chart illustrating an exemplary waveform of a drive signal.
Figure 15C:
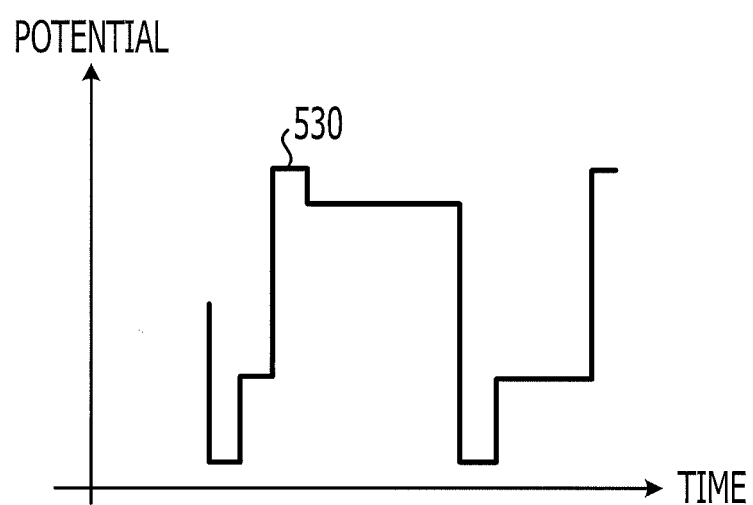
FIG. 15C is a third chart illustrating an exemplary waveform of a drive signal.

FIG. 15A to FIG. 15C are charts illustrating exemplary waveforms of drive signals. In FIG. 15A to FIG. 15C, portions similar to those illustrated in FIG. 5A to FIG. 5C are indicated by the same reference characters, and the corresponding descriptions are omitted. A normal phase signal 1511 illustrated in FIG. 15A represents a normal phase signal output from the pre-emphasis circuit 111. A reverse phase signal 1512 illustrated in FIG. 15A represents a reverse phase signal output from the pre-emphasis circuit 111. The DC offsets of the normal phase signal 1511 and the reverse phase signal 1512 are assumed to be V (e.g., V=0). As illustrated in FIG. 15A, regarding each of the normal phase signal 1511 and the reverse phase signal 1512, the rising edge portion and the falling edge portion are symmetrically emphasized.

A normal phase signal 1521 illustrated in FIG. 15B represents a normal phase signal output from the offset adjustment circuit 112. A reverse phase signal 1522 illustrated in FIG. 15B represents a reverse phase signal output from the offset adjustment circuit 112. As illustrated in FIG. 15B, here, it is assumed that the offset adjustment circuit 112 has adjusted the DC offset of the normal phase signal 1521 to V+Va (Va>0). It is also assumed that the rising edge portion of the normal phase signal 1521 enters a nonlinear portion of the input-output characteristic of the differential amplifier 711. Further, it is assumed that the offset adjustment circuit 112 has adjusted the DC offset of the reverse phase signal 1522 to V−Va. It is also assumed that the falling edge portion of the reverse phase signal 1522 enters a nonlinear portion of the input-output characteristic of the differential amplifier 711.

The drive signal 530 illustrated in FIG. 15C represents a drive signal output from the differential amplifier 711. Here, the rising edge portion of the normal phase signal 1521 input to the differential amplifier 711 enters a nonlinear portion of the input-output characteristic of the differential amplifier 711, and therefore the falling edge portion of the normal phase signal 1521 is more emphasized than the rising edge portion.

As a result, in the differential amplifier 711, the normal phase signal 1521 whose falling edge portion is more emphasized and the reverse phase signal 1522 whose rising edge portion is more emphasized are differentially amplified, and therefore the drive signal 530 whose rising edge portion is more emphasized is output from the differential amplifier 711. At this point, the asymmetry between the rising edge portion and the falling edge portion of the normal phase signal 1521 and the asymmetry between the rising edge portion and the falling edge portion of the reverse phase signal 1522 are combined together.

For this reason, the asymmetry between the rising edge portion and the falling edge portion of the drive signal 530 illustrated in FIG. 15C is larger than that of the drive signal 530 illustrated in FIG. 5C. In this way, the normal phase signal 1511 and the reverse phase signal 1512 are provided with DC offsets in opposite directions (positive and negative) and are differentially amplified, which enables the rising edge portion and the falling edge portion of the drive signal 530 to be made asymmetrical with high efficiency.

The signal shaping circuit 110, however, is not limited to such a configuration that the normal phase signal 1511 and the reverse phase signal 1512 are provided with DC offsets in opposite directions. Specifically, by making the DC offset of the normal phase signal 1511 and the DC offset of the reverse phase signal 1512 different in magnitude, the rising edge portion and the falling edge portion of the drive signal 530 can be asymmetrically emphasized. By making the DC offset of the normal phase signal 1511 higher than the DC offset of the reverse phase signal 1512, the falling edge portion of the drive signal 530 can be more emphasized than the rising edge portion.

Figure 16A:
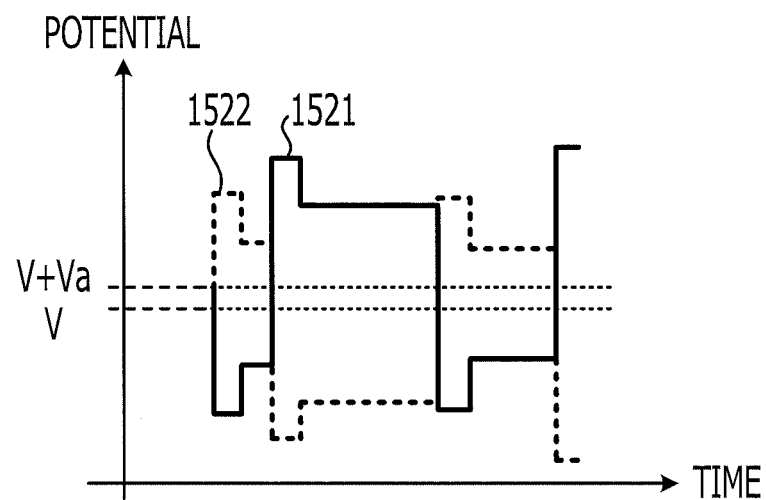
FIG. 16A is a first chart illustrating another exemplary waveform of a drive signal.
Figure 16B:
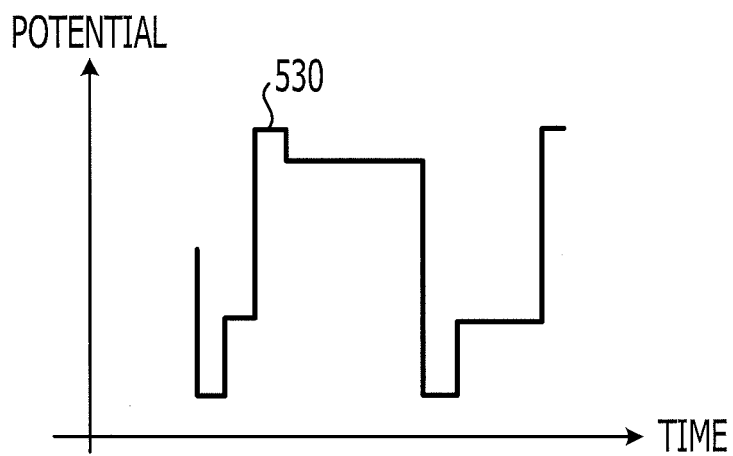
FIG. 16B is a second chart illustrating another exemplary waveform of a drive signal.

FIG. 16A and FIG. 16B are charts illustrating other exemplary waveforms of drive signals. In FIG. 16A and FIG. 16B, portions similar to those illustrated in FIG. 15B to FIG. 15C are indicated by the same reference characters, and the corresponding descriptions are omitted. A normal phase signal and a reverse phase signal output from the pre-emphasis circuit 111 are similar to the normal phase signal 1511 and the reverse phase signal 1512 illustrated in FIG. 15A.

As illustrated in FIG. 16A, here, it is assumed that the offset adjustment circuit 112 does not adjust the DC offset of the reverse phase signal 1522, so that the DC offset of the reverse phase signal 1522 remains at V. It is assumed that the falling edge portion of the reverse phase signal 1522 does not enter a nonlinear portion of the input-output characteristic of the differential amplifier 711. In this case, regarding the differential amplifier 711, the falling edge portion and the rising edge portion of the reverse phase signal 1522 remains symmetrical.

Thus, in the differential amplifier 711, the normal phase signal 1521 whose falling edge portion is more emphasized and the reverse phase signal 1522 whose falling edge portion and rising edge portion are symmetrical are differentially amplified. Therefore, the drive signal 530 whose rising edge portion is more emphasized is output from the differential amplifier 711. However, an asymmetry does not arise from the falling edge portion and the rising edge portion of the reverse phase signal 1522, and therefore the drive signal 530 illustrated in FIG. 16B has a smaller asymmetry between the rising edge portion and the falling edge portion than the drive signal 530 illustrated in FIG. 15C.

Although not illustrated, for example, without adjustment of the DC offset of the normal phase signal 1511 such that the DC offset of the normal phase signal 1511 remains at V, the DC offset of the reverse phase signal 1512 may be adjusted to V−Va. In this way, the rising edge portion of the drive signal 530 can be more emphasized than the falling edge portion. As such, the configuration may be such that the DC offset of either the normal phase signal 1511 or the reverse phase signal 1512 is adjusted. Also in this case, the rising edge portion and the falling edge portion of the drive signal 530 can be asymmetrically emphasized.

Figure 17A:
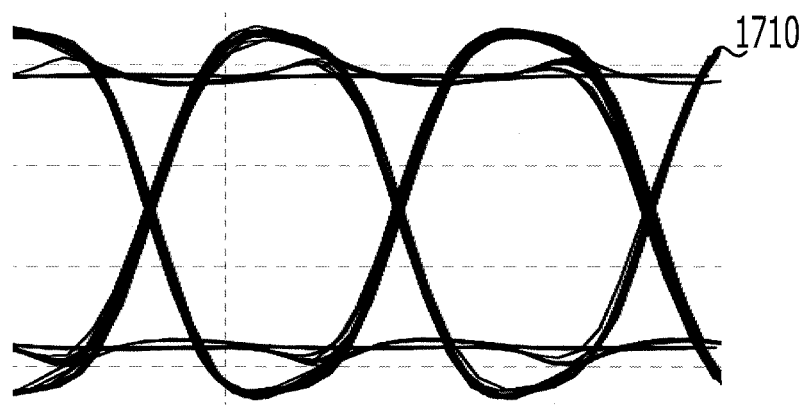
FIG. 17A is a first chart illustrating an exemplary eye pattern of a drive signal.
Figure 17B:
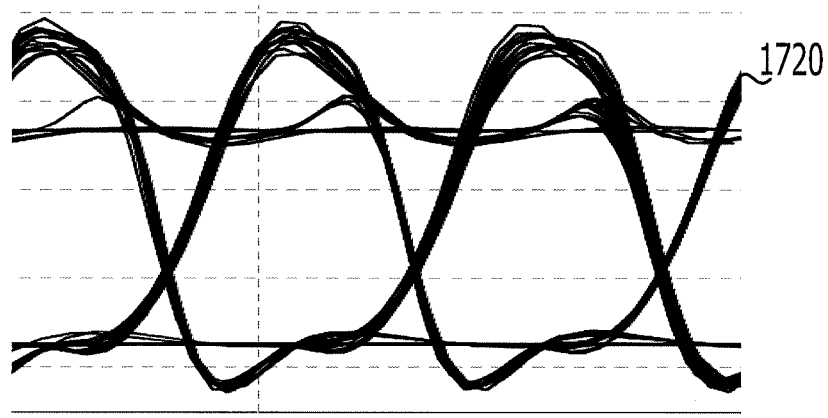
FIG. 17B is a second chart illustrating an exemplary eye pattern of a drive signal.
Figure 17C:
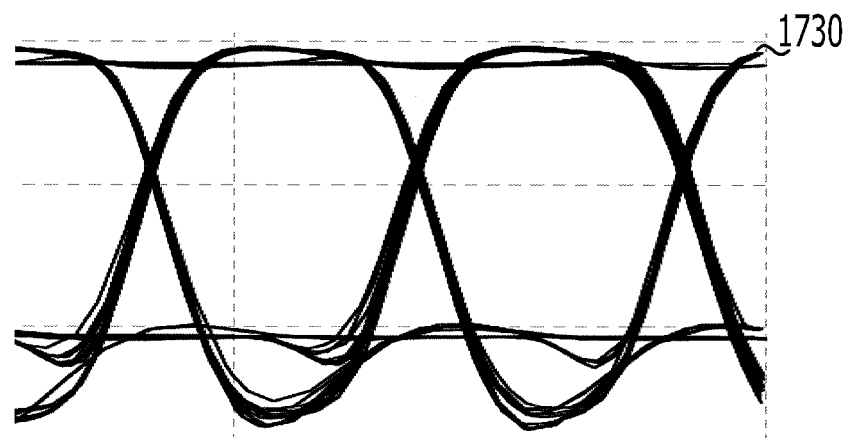
FIG. 17C is a third chart illustrating an exemplary eye pattern of a drive signal.

FIG. 17A to FIG. 17C are charts illustrating exemplary eye patterns of drive signals. An eye pattern 1710 illustrated in FIG. 17A shows a drive signal output from the pre-emphasis circuit 111. As shown in the eye pattern 1710, regarding the drive signal output from the pre-emphasis circuit 111, the rising edge portion and the falling edge portion are symmetrically emphasized.

An eye pattern 1720 illustrated in FIG. 17B shows a drive signal output from the differential amplifier 711 in the case where the DC offset of the normal phase signal is adjusted to be lower than the DC offset of the reverse phase signal. As shown in the eye pattern 1720, in this case, a drive signal in which the rising edge portion is more emphasized than the falling edge portion is output from the differential amplifier 711.

An eye pattern 1730 illustrated in FIG. 17C shows a drive signal output from the differential amplifier 711 in the case where the DC offset of the normal phase signal is adjusted to be higher than the DC offset of the reverse phase signal. As shown in the eye pattern 1730, in this case, a drive signal in which the falling edge portion is more emphasized than the rising edge portion is output from the differential amplifier 711.

As described above, with the signal shaping circuit 110 according to the third embodiment, similar effects to those of the signal shaping circuit 110 according to the first embodiment can be obtained. Furthermore, a normal phase signal and a reverse phase signal are adjusted according to DC offsets in opposite directions (positive and negative) and are differentially amplified, which enables the rising edge portion and the falling edge portion of a drive signal to be made asymmetrical with high efficiency.

Fourth Embodiment

Configurations of Signal Shaping Circuit and Optical Transmission Apparatus

Figure 18:
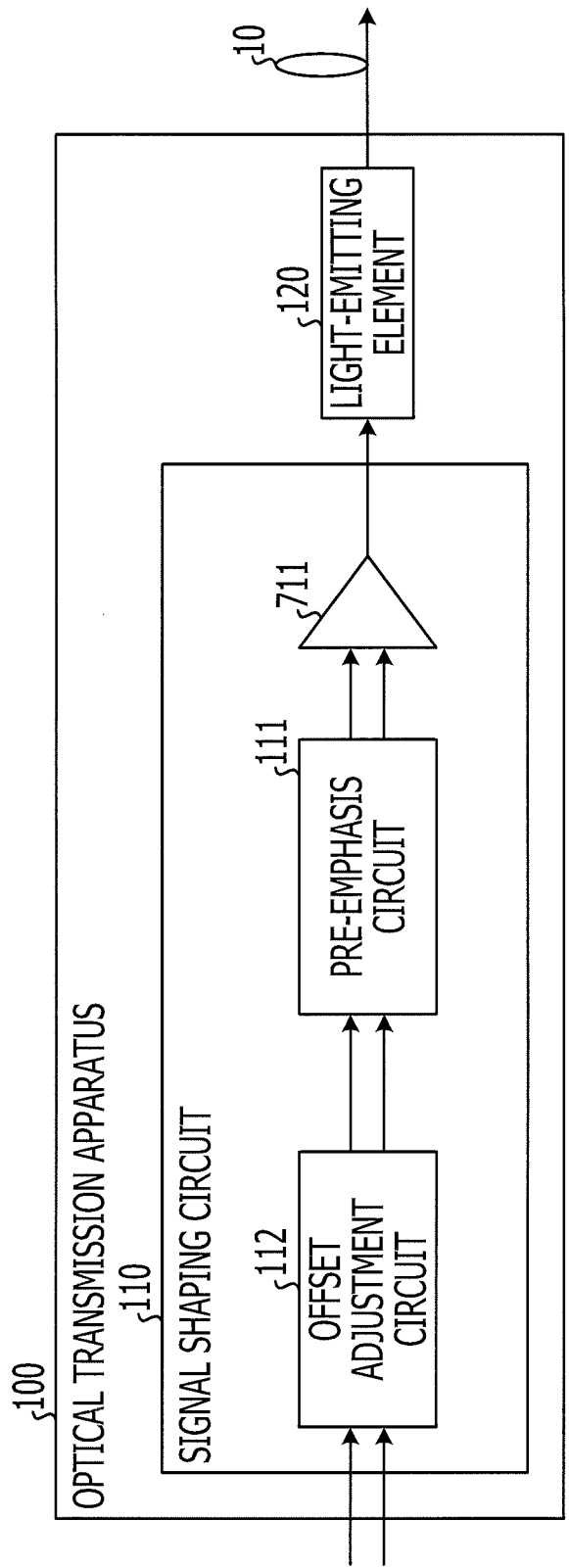
FIG. 18 illustrates a signal shaping circuit and an optical transmission apparatus according to a fourth embodiment.

FIG. 18 illustrates a signal shaping circuit and an optical transmission apparatus according to a fourth embodiment. In FIG. 18, configurations similar to those illustrated in FIG. 11 are indicated by the same reference characters, and the corresponding descriptions are omitted. As illustrated in FIG. 18, the signal shaping circuit 110 according to the fourth embodiment includes the offset adjustment circuit 112 before the pre-emphasis circuit 111.

The offset adjustment circuit 112 adjusts the DC offsets of the normal phase signal and the reverse phase signal that have been input to the signal shaping circuit 110, and outputs the signals to the pre-emphasis circuit 111. The pre-emphasis circuit 111 performs pre-emphasis of each of the normal phase signal and the reverse phase signal output from the offset adjustment circuit 112, and outputs, to the differential amplifier 711, the normal phase signal and the reverse phase signal the pre-emphasis of which has been performed. The differential amplifier 711 performs differential amplification based on the normal phase signal and the reverse phase signal that have been output from the pre-emphasis circuit 111.

The input-output characteristic of each of the amplifiers 201 and 203 in the pre-emphasis circuit 111 has nonlinear portions in which the change of output with respect to input is nonlinear. For example, the input-output characteristics of each of the amplifiers 201 and 203 are assumed to be similar to the input-output characteristics of the amplifier 113 illustrated in FIG. 4A to FIG. 4C.

Thus, regarding a drive signal whose DC offset is adjusted by the offset adjustment circuit 112, the rising edge and the falling edge can be emphasized, and the emphasis amounts of the rising edge and the falling edge can be made asymmetrical. In this case, the differential amplifier 711 need not be an amplifier having nonlinear portions in which the change of output with respect to input is nonlinear.

As described above, in the signal shaping circuit 110 according to the fourth embodiment, the configuration may be such that the offset adjustment circuit 112 is provided before the pre-emphasis circuit 111. In such a configuration, by utilizing the nonlinear portions of the amplifiers 201 and 203 in the pre-emphasis circuit 111, the rising edge portion and the falling edge portion of a drive signal can be made asymmetrical, which enables similar effects to those of the signal shaping circuit 110 according to the first embodiment to be obtained.

With reference to FIG. 18, a description has been given of a configuration in which, in the signal shaping circuit 110 illustrated in FIG. 11, the offset adjustment circuit 112 is provided before the pre-emphasis circuit 111. The configuration, however, is not limited to this, and may be such that the offset adjustment circuit 112 is provided before the pre-emphasis circuit 111 in the signal shaping circuit 110 according to each of the foregoing embodiments.

(Adjustment of DC Offset)

Next, a description will be given of adjustment of a DC offset in the optical transmission apparatus according to any of the foregoing embodiments.

Figure 19:
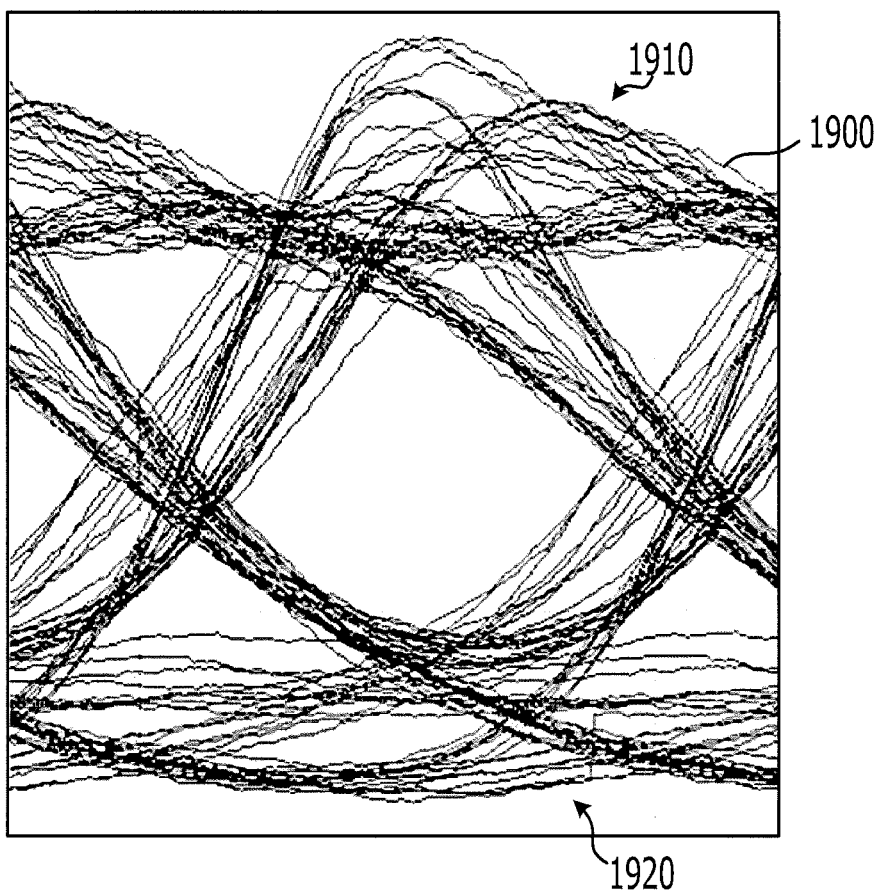
FIG. 19 is a chart illustrating an exemplary eye pattern of an optical signal.

FIG. 19 illustrates an exemplary eye pattern of an optical signal. In FIG. 19, the horizontal axis represents time [bit period], and the vertical axis represents the amplitude [a. u.]. An eye pattern 1900 illustrated in FIG. 19 is obtained, for example, by measuring, by using a measuring device, an optical signal emitted from the light-emitting element 120.

For example, a person involved in adjustment of the optical transmission apparatus 100 changes the adjustment value of a DC offset by means of the offset adjustment circuit 112 so as to make symmetrical a rising edge portion 1910 and a falling edge portion 1920 shown in the eye pattern 1900. Thus, the asymmetry between the rising edge portion and the falling edge portion of a drive signal can be adjusted so as to compensate for limited high-speed responsivities to achieve even high-speed responsivities of the rising edge portion and the falling edge portion in the light-emitting element 120.

The signal shaping circuit and the optical transmission apparatus disclosed herein have effects in that a light-emitting element can be driven at a high speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A driver for shaping a drive signal, comprising:
   a pre-emphasis circuit configured to emphasize a rising edge portion and a falling edge portion of the drive signal;
   an offset adjustment circuit configured to apply a direct-current offset to the drive signal; and
   an amplifier configured to amplify the drive signal with the direct-current offset adjusted by the adjustment circuit, wherein
   the amplifier has an input-output characteristic with a non-linear portion, and
   the offset adjustment circuit adjusts the direct-current offset so that the drive signal is amplified in the nonlinear portion.

2. The driver according to claim 1, wherein
   the offset adjustment circuit adjusts the direct-current offset so that the rising edge portion of the drive signal input to the amplifier is included in the nonlinear portion.

3. The driver according to claim 1, wherein
   the drive signal is a differential signal including a normal phase signal and a reverse phase signal,
   the offset adjustment circuit adjusts the normal phase signal and the reverse phase signal included in the differential signal according to direct-current offsets different from each other, and
   the amplifier is a differential amplifier configured to differentially amplify the differential signal.

4. The driver according to claim 3, wherein
   the offset adjustment circuit adjusts the direct-current offset of the normal phase signal so the direct-current offset of the normal phase signal is higher than the direct-current offset of the reverse phase signal.

5. The driver according to claim 3, wherein
   the offset adjustment circuit adjusts the normal phase signal and the reverse phase signal included in the differential signal according to DC offsets opposite in direction to each other.

6. The driver according to claim 1, wherein
   the pre-emphasis circuit branches the drive signal, and provides a delay difference between branched drive signals and adds the branched drive signals together, thereby symmetrically emphasizing the rising edge portion and the falling edge portion.

7. The driver according to claim 1, wherein
   the offset adjustment circuit includes:
   a capacitor configured to remove a direct-current offset of the drive signal; and
   at least one of a variable resistor and a variable current source configured to provide a direct-current offset to the drive signal with the direct-current offset removed by the capacitor.

8. The driver according to claim 1, wherein
   the offset adjustment circuit adjusts a direct-current offset of the drive signal with the rising edge portion and the falling edge portion emphasized by the pre-emphasis circuit.

9. The driver according to claim 1, wherein
   the pre-emphasis circuit emphasizes the rising edge portion and the falling edge portion of the drive signal with the direct-current offset adjusted by the offset adjustment circuit, and
   the amplifier is an amplifier provided in the pre-emphasis circuit.

10. An optical transmission apparatus comprising:
    a pre-emphasis circuit configured to symmetrically emphasize a rising edge portion and a falling edge portion of a drive signal;
    an offset adjustment circuit configured to apply a direct-current offset to the drive signal;
    an amplifier configured to amplify the drive signal with the direct-current offset adjusted by the adjustment circuit; and
    a light-emitting element configured to convert the drive signal into an optical signal, wherein
    the amplifier has an input-output characteristic with a non-linear portion, and
    the offset adjustment circuit adjusts the direct-current offset so that the drive signal is amplified in the nonlinear portion.

11. The optical transmission apparatus according to claim 10, wherein
    the offset adjustment circuit adjusts the direct-current offset so that the rising edge portion of the drive signal input to the amplifier is included in the nonlinear portion.

12. The optical transmission apparatus according to claim 10, wherein
the drive signal is a differential signal including a normal phase signal and a reverse phase signal,
the offset adjustment circuit adjusts the normal phase signal and the reverse phase signal included in the differential signal according to direct-current offsets different from each other, and
the amplifier is a differential amplifier configured to differentially amplify the differential signal.

13. The optical transmission apparatus according to claim 12, wherein
the offset adjustment circuit adjusts the direct-current offset of the normal phase signal so the direct-current offset of the normal phase signal is higher than the direct-current offset of the reverse phase signal.

14. The optical transmission apparatus according to claim 12, wherein
the offset adjustment circuit adjusts the normal phase signal and the reverse phase signal included in the differential signal according to DC offsets opposite in direction to each other.

15. The optical transmission apparatus according to claim 10, wherein
the pre-emphasis circuit branches the drive signal, and provides a delay difference between branched drive signals and adds the branched drive signals together, thereby symmetrically emphasizing the rising edge portion and the falling edge portion.

16. The optical transmission apparatus according to claim 10, wherein
the offset adjustment circuit includes:
a capacitor configured to remove a direct-current offset of the drive signal; and
at least one of a variable resistor and a variable current source configured to provide a direct-current offset to the drive signal with the direct-current offset removed by the capacitor.

17. The optical transmission apparatus according to claim 10, wherein
the offset adjustment circuit adjusts a direct-current offset of the drive signal with the rising edge portion and the falling edge portion emphasized by the pre-emphasis circuit.

18. The optical transmission apparatus according to claim 10, wherein
the pre-emphasis circuit emphasizes the rising edge portion and the falling edge portion of the drive signal with the direct-current offset adjusted by the offset adjustment circuit, and
the amplifier is an amplifier provided in the pre-emphasis circuit.

19. A method for shaping a drive signal, comprising:
emphasizing a rising edge portion and a falling edge portion of the drive signal;
applying a direct-current offset to the drive signal;
providing an amplifier with an input-output characteristic with a nonlinear portion;
amplifying the drive signal with the direct-current offset with the amplifier; and
adjusting the direct-current offset so that the drive signal is amplified in the nonlinear portion.

* * * * *